US012713184B2

(12) United States Patent
Suzuki

(10) Patent No.: US 12,713,184 B2
(45) Date of Patent: Aug. 18, 2026

(54) TRANSDUCER AND METHOD FOR MANUFACTURING SAME

(71) Applicant: ROHM CO., LTD., Kyoto (JP)

(72) Inventor: Tatsuya Suzuki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 167 days.

(21) Appl. No.: 18/882,095

(22) Filed: Sep. 11, 2024

(65) Prior Publication Data

US 2025/0008275 A1 Jan. 2, 2025

Related U.S. Application Data

(63) Continuation of application No. PCT/JP2023/005322, filed on Feb. 15, 2023.

(30) Foreign Application Priority Data

Mar. 14, 2022 (JP) ................................ 2022-039299

(51) Int. Cl.
*H04R 17/00* (2006.01)
*H04R 7/04* (2006.01)
*H04R 31/00* (2006.01)

(52) U.S. Cl.
CPC ............... *H04R 17/00* (2013.01); *H04R 7/04* (2013.01); *H04R 31/003* (2013.01); *H04R 2201/003* (2013.01); *H04R 2400/11* (2013.01)

(58) Field of Classification Search
CPC ........ H04R 17/00; H04R 7/04; H04R 31/003; H04R 2201/003; H04R 2400/11
See application file for complete search history.

(56) References Cited

U.S. PATENT DOCUMENTS

| | | | | |
|---|---|---|---|---|
| 9,645,032 | B2 * | 5/2017 | Shimoyama | H04R 1/42 |
| 2022/0360871 | A1 * | 11/2022 | Naiki | H10N 30/872 |
| 2024/0064473 | A1 * | 2/2024 | Suzuki | H04R 31/003 |

FOREIGN PATENT DOCUMENTS

| | | |
|---|---|---|
| JP | 2011031385 A | 2/2011 |

OTHER PUBLICATIONS

International Search Report issued for International Patent Application No. PCT/JP2023/005322, Date of mailing: May 16, 2023, 6 pages including English machine translation.

(Continued)

*Primary Examiner* — Suhan Ni
(74) *Attorney, Agent, or Firm* — HSML .P.C.

(57) ABSTRACT

A vibrating film has, at a portion of an outer peripheral edge of the vibrating film, a connection portion connected to a supporting body, a cantilever is formed that includes the vibrating film and a portion of a piezoelectric element disposed on the vibrating film and has a fixed end and a free end, an internal wiring with one end portion side being electrically connected to the piezoelectric element and having, at another end portion side, a pad portion for external wiring connection on a supporting body outside the vibrating film and a protective substrate having a wall portion formed such as to surround the cantilever and being fixed to the supporting body are further included, the wall portion has, at a location corresponding to a length intermediate portion of the connection portion, a cutout portion in which the wall portion is not present, and the pad portion is disposed at the cutout portion side with respect to the connection portion.

8 Claims, 24 Drawing Sheets

(56) References Cited

OTHER PUBLICATIONS

Written Opinion issued for International Patent Application No. PCT/JP2023/005322, Date of mailing: May 16, 2023, 5 pages including English machine translation.

* cited by examiner

TRANSDUCER AND METHOD FOR MANUFACTURING SAME

CROSS REFERENCE TO RELATED APPLICATIONS

The present application is a continuation application of PCT Application No. PCT/JP2023/005322, filed on Feb. 15, 2023, which corresponds to Japanese Patent Application No. 2022-039299 filed on Mar. 14, 2022, with the Japan Patent Office, and the entire disclosure of this application is incorporated herein by reference.

TECHNICAL FIELD

The present disclosure relates to a transducer and a method for manufacturing the same.

BACKGROUND ART

Transducers are known as one of various types of MEMS (micro electro mechanical systems) that are manufactured using semiconductor manufacturing processes. A MEMS transducer includes a piezoelectric element and a film body (vibrating film) that is driven by the piezoelectric element and is housed, for example, in a portable electronic equipment case, etc., as a speaker or a microphone (see Japanese Patent Application Publication No. 2011-31385).

DESCRIPTION OF EMBODIMENTS

Figure 1:
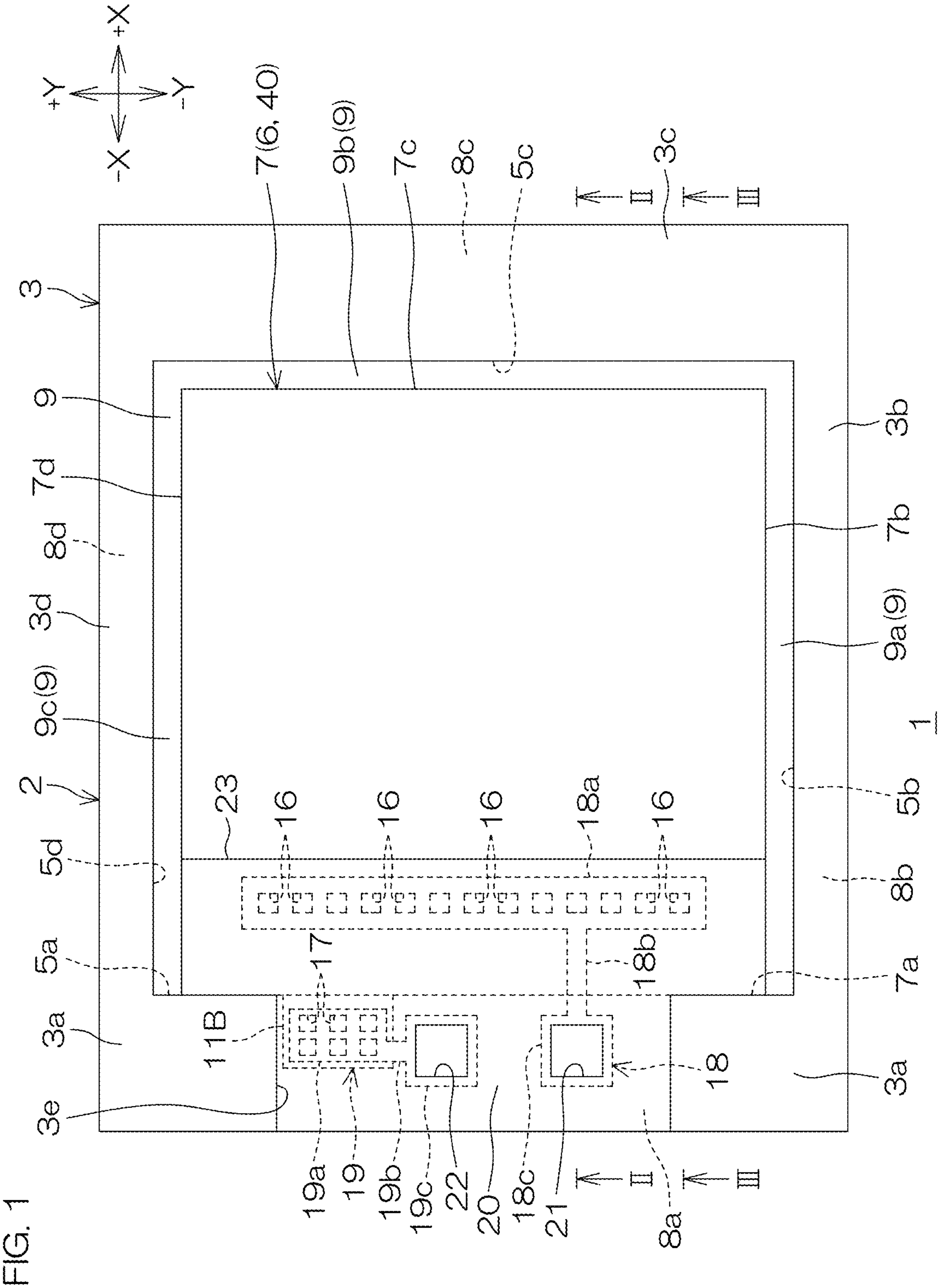
FIG. 1 is an illustrative plan view of a transducer according to a first preferred embodiment of the present disclosure.

A preferred embodiment of the present disclosure provides a transducer including a supporting body that has a cavity, a vibrating film that is provided facing the cavity and capable of vibrating in the facing direction, and a piezoelectric element at least a portion of which is formed on a front surface of the vibrating film at an opposite side to the cavity and where the vibrating film has, at a portion of an outer peripheral edge of the vibrating film, a connection portion connected to the supporting body, a cantilever is formed that includes the vibrating film and a portion of the piezoelectric element disposed on the vibrating film and has a fixed end and a free end, an internal wiring with one end portion side being electrically connected to the piezoelectric element and having, at another end portion side, a pad portion for external wiring connection on the supporting body outside the vibrating film and a protective substrate having a wall portion formed such as to surround the cantilever and being fixed to the supporting body are further included, the wall portion has, at a location corresponding to a length intermediate portion of the connection portion, a cutout portion in which the wall portion is not present, and the pad portion is disposed at the cutout portion side with respect to the connection portion.

With this arrangement, the transducer with which size reduction can be achieved can be obtained.

In the preferred embodiment of the present disclosure, the piezoelectric element includes a lower electrode at least a portion of which is disposed on the vibrating film, a piezoelectric film that is formed on the lower electrode, and an upper electrode that is formed on the piezoelectric film and the internal wiring includes an upper wiring that is disposed such as to straddle the length intermediate portion of the connection portion, has one end portion side electrically connected to the upper electrode on the vibrating film, and has a first pad portion for external wiring connection on the supporting body outside the vibrating film and a lower wiring that has one end portion side electrically connected to the lower electrode and has a second pad portion for external wiring connection on the supporting body outside the vibrating film.

In the preferred embodiment of the present disclosure, the supporting body includes a supporting substrate that has the cavity and a frame body that is formed on the supporting substrate and formed such as to surround the cavity, the connection portion of the vibrating film is connected to the frame body, and a slit in communication with the cavity is formed between the frame body and an outer peripheral edge of the vibrating film excluding the connection portion.

In the preferred embodiment of the present disclosure, a hydrogen barrier film that covers a front surface of the frame body, the front surface of the vibrating film, and a front surface of the piezoelectric element and an insulating interlayer film that is selectively formed on the hydrogen barrier film are included, the upper wiring is formed on the insulating interlayer film, the one end portion side of the upper wiring penetrates through a laminated film of the hydrogen barrier film and the insulating interlayer film and is electrically connected to the upper electrode, the lower wiring is formed on the insulating interlayer film, and the one end portion side of the lower wiring penetrates through the laminated film of the hydrogen barrier film and the insulating interlayer film and is electrically connected to the lower electrode.

In the preferred embodiment of the present disclosure, a passivation film that is formed on the insulating interlayer film and covers the upper wiring and the lower wiring is included.

In the preferred embodiment of the present disclosure, a resin that is embedded in the cutout portion is included.

In the preferred embodiment of the present disclosure, the protective substrate has an eave-shaped portion that is disposed along the cutout portion at a portion further to the vibrating film side than the cutout portion.

A preferred embodiment of the present disclosure provides a method for manufacturing a transducer including a step of forming a piezoelectric element on a vibrating film formation layer that is formed on a supporting substrate, a step of forming a slit penetrating through the vibrating film formation layer in a thickness direction to form, in the vibrating film formation layer, a vibrating film and a frame body that surrounds the vibrating film and with which a portion is connected to a portion of an outer peripheral edge of the vibrating film, a step of forming an internal wiring with one end portion side being electrically connected to the piezoelectric element and having, at another end portion side, a pad portion for external wiring connection on the frame body, and a step of etching the supporting substrate from a cavity formation planned region of a front surface of the supporting substrate at an opposite side to the vibrating film formation layer to form, in a region facing the vibrating film, a cavity that is in communication with the slit, and where a cantilever that includes the vibrating film and a portion of the piezoelectric element disposed on the vibrating film and has a fixed end and a free end is formed by the step of forming the cavity, a step of fixing, to the supporting body, a protective substrate having a wall portion formed such as to surround the cantilever is further included, the wall portion has, at a location corresponding to a length intermediate portion of the connection portion, a cutout portion in which the wall portion is not present, and the pad portion is disposed at the cutout portion side with respect to the connection portion.

With this manufacturing method, a transducer with which size reduction can be achieved can be manufactured.

Preferred embodiments of the present disclosure shall be described in detail below with reference to the attached drawings.

Figure 2:
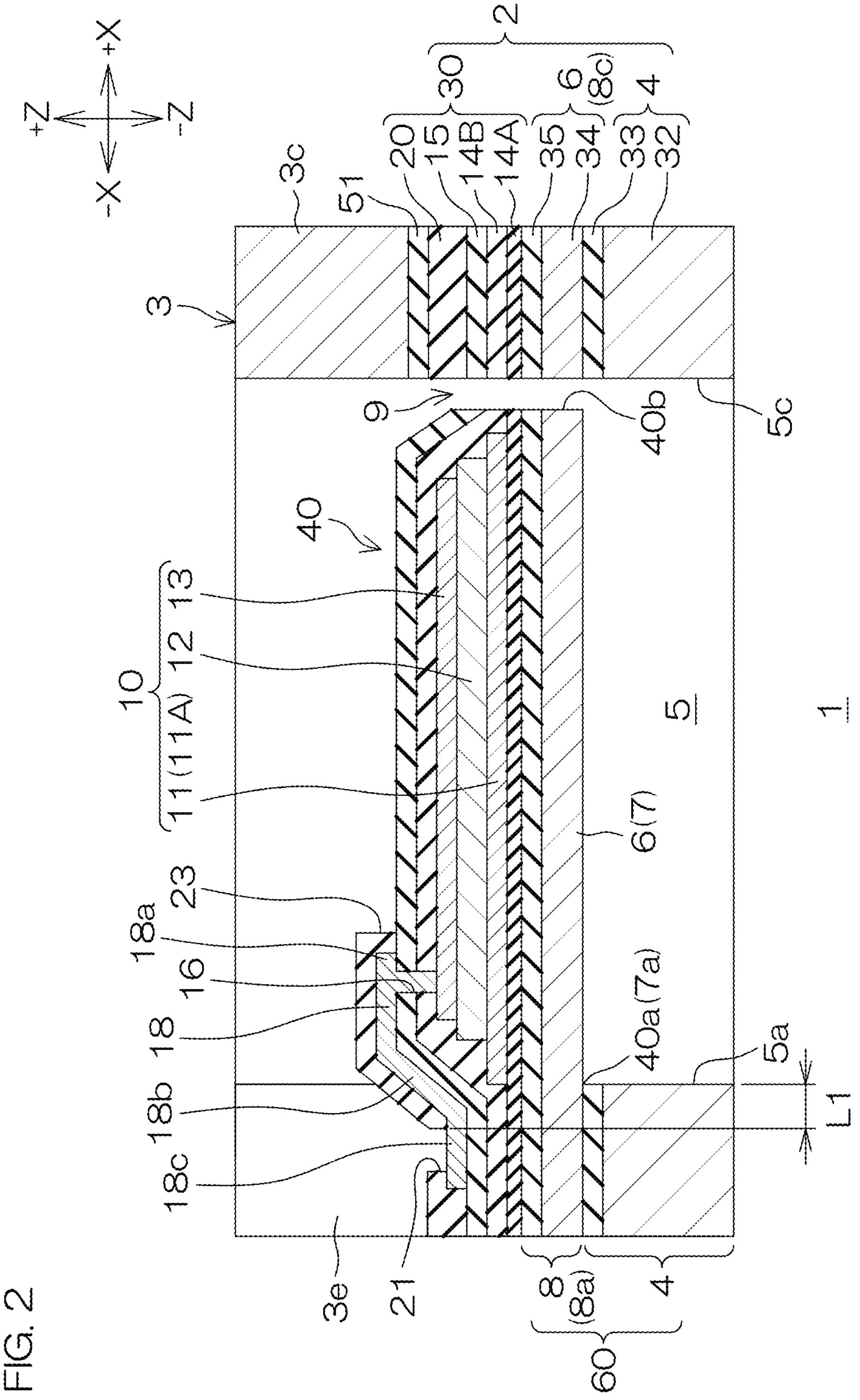
FIG. 2 is an illustrative sectional view taken along line II-II of FIG. 1.
Figure 3:
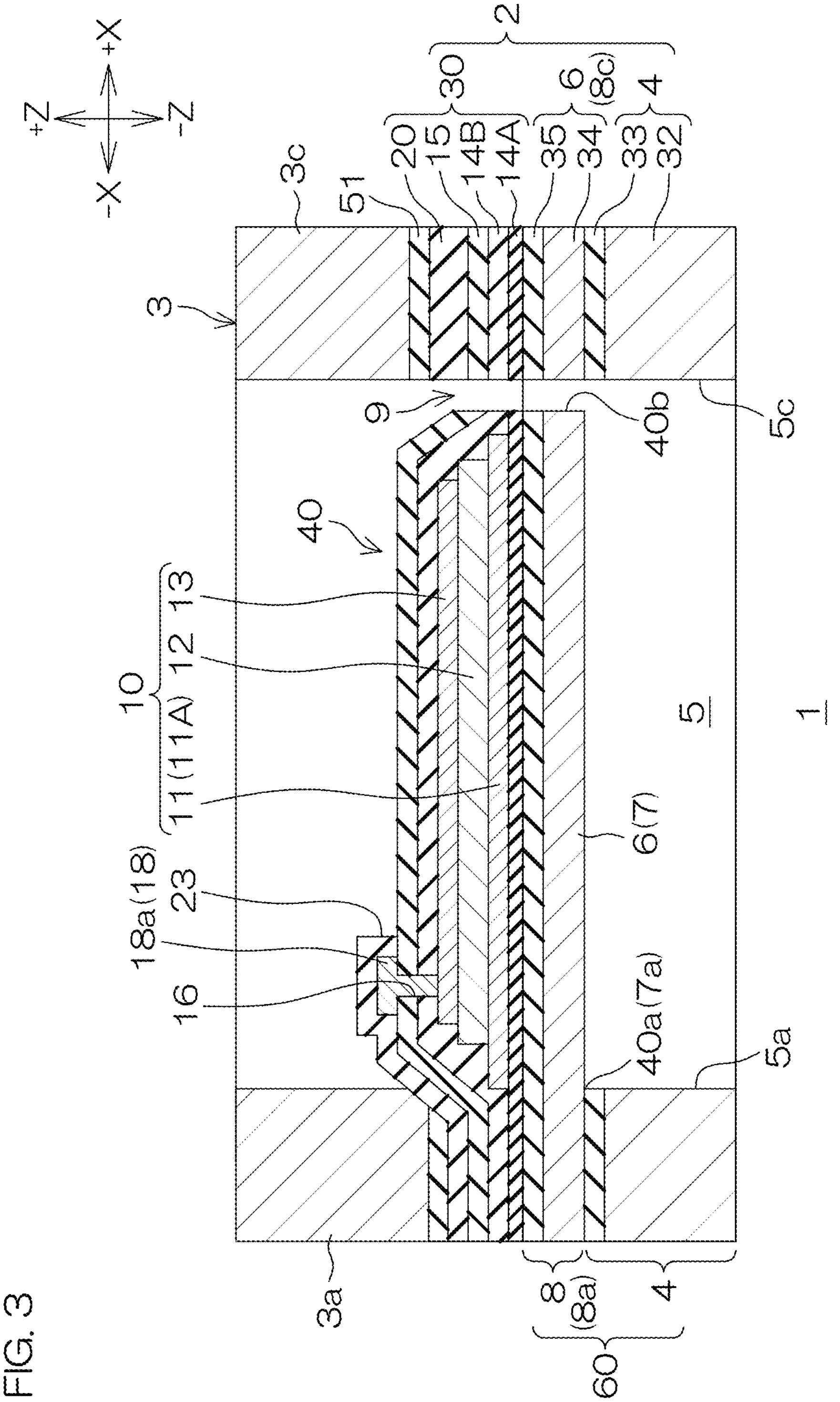
FIG. 3 is an illustrative sectional view taken along line III-III of FIG. 1.

FIG. 1 is an illustrative plan view of a transducer according to a first preferred embodiment of the present disclosure. FIG. 2 is an illustrative sectional view taken along line II-II of FIG. 1. FIG. 3 is an illustrative sectional view taken along line III-III of FIG. 1.

For convenience of description, a +X direction, a −X direction, a +Y direction, a −Y direction, a +Z direction, and a −Z direction shown in FIG. 1 to FIG. 3 are used at times in the following description. The +X direction is a predetermined direction along a front surface of a supporting substrate 4 in plan view and the +Y direction is a direction along the front surface of the supporting substrate 4 and is a direction that is orthogonal to the +X direction in plan view. The +Z direction is a direction along a thickness of the supporting substrate 4 and is a direction that is orthogonal to the +X direction and the +Y direction.

The −X direction is a direction opposite to the +X direction. The −Y direction is a direction opposite to the +Y direction. The −Z direction is a direction opposite to the +Z direction. The +X direction and the −X direction shall be referred to simply as the "X direction" when referred to collectively. The +Y direction and the −Y direction shall be referred to simply as the "Y direction" when referred to collectively. The +Z direction and the −Z direction shall be referred to simply as the "Z direction" when referred to collectively.

A transducer 1 includes a substrate assembly 2 and a protective substrate 3. The substrate assembly 2 includes the supporting substrate 4, a vibrating film formation layer 6, and a piezoelectric element 10.

In plan view, the supporting substrate 4 is of a quadrilateral shape and has two sides that face each other at an interval in the X direction and are parallel to the Y direction and two sides that face each other at an interval in the Y direction and are parallel to the X direction. The supporting substrate 4 is made, for example, from a portion of an SOI (silicon on insulator) substrate. Specifically, the SOI substrate includes a silicon (Si) substrate 32 as a supporting layer, an oxide film layer 33 as a BOX layer formed on a front surface of the preceding, and a silicon (Si) layer 34 as an active layer formed on a front surface of the preceding. In this preferred embodiment, a silicon oxide ($SiO_2$) film 35 is formed on a front surface of the silicon layer 34. The supporting substrate 4 includes, among the above, the silicon substrate 32 and the oxide film layer 33 formed on the front surface thereof. A thickness of the supporting substrate 4 is approximately 380 μm.

The supporting substrate 4 has a cavity (hollow space) 5 that is formed by a penetrating hole penetrating through in the thickness direction (Z direction). In plan view, the cavity 5 is of a quadrilateral shape and has two sides 5*a* and Sc that face each other at an interval in the X direction and are parallel to the Y direction and two sides 5*b* and 5*d* that face each other at an interval in the Y direction and are parallel to the X direction. Of the sides 5*a* and Sc, the side at the −X side shall be referred to as the first side 5*a* and the side at the +X side shall be referred to as the third side Sc. Also, of the sides 5*b* and 5*d*, the side at the −Y side shall be referred to as the second side 5*b* and the side at the +Y side shall be referred to as the fourth side 5*d*.

The vibrating film formation layer 6 is formed on the supporting substrate 4. The vibrating film formation layer 6 is constituted of a laminated film in which the silicon layer 34 and the silicon oxide layer 35 are laminated in that order from the supporting substrate 4 side. A film thickness of the silicon layer 34 is approximately 20 μm and a film thickness of the silicon oxide film 35 is approximately 0.5 μm.

In plan view, the vibrating film formation layer 6 includes a vibrating film 7 that faces the cavity 5 and a frame body 8 that is formed such as to surround the cavity 5. The vibrating film 7 has, at a portion of an outer peripheral edge of the vibrating film 7, a connection portion (a first side to be described below) 7*a* that is connected to the frame body 8. A slit 9 that is in communication with the cavity 5 is formed between the frame body 8 and an outer edge of the vibrating film 7 excluding the connection portion 7*a*.

In this preferred embodiment, the vibrating film 7 is, in plan view, of an oblong shape substantially similar to the cavity 5. The vibrating film 7 has the first side (connection portion) 7a oriented along the first side 5a of the cavity 5, a second side 7b oriented along the second side 5b of the cavity 5, a third side 7c oriented along the third side Sc of the cavity 5, and a fourth side 7d oriented along the fourth side 5d of the cavity 5. The frame body 8 has a rectangular annular shape in plan view. The frame body 8 is constituted of a first frame portion 8a at the −X side, a second frame portion 8b at the −Y side, a third frame portion 8c at the +X side, and a fourth frame portion 8d at the +Y side. In this preferred embodiment, the vibrating film 7 is connected to the first frame portion 8a of the frame body 8. Therefore, in this preferred embodiment, the vibrating film 7 has the connection portion 7a that is connected to the first frame portion 8a of the frame body 8. The connection portion 7a is matched (in conformity) with an intermediate portion of the first side 5a of the cavity 5 in plan view.

In a manufacturing process, the slit 9 is formed before the cavity 5 is formed in the supporting substrate 4. In a step in which the slit 9 is formed, the slit 9 is formed such that, from a front surface of a passivation film 20 and an exposed surface of an interlayer insulating film 15 that are to be described later and are formed on the vibrating film formation layer 6, it penetrates continuously through a second hydrogen barrier film 14B, a first hydrogen barrier film 14A, and the vibrating film formation layer 6 and reaches the oxide film layer 33.

In plan view, the slit 9 is constituted of a first portion 9a oriented along the second side 5b of the cavity 5, a second portion 9b oriented along the third side Sc of the cavity 5, and a third portion 9c oriented along the fourth side 5d of the cavity 5. The second portion 9b joins a +X direction side end of the first portion 9a and a +X direction side end of the third portion 9c.

An outer edge of the first portion 9a is substantially matched with the second side 5b of the cavity 5 in plan view. An outer edge of the second portion 9b is substantially matched with the third side Sc of the cavity 5 in plan view. An outer edge of the third portion 9c is substantially matched with the fourth side 5d of the cavity 5 in plan view.

The connection portion 7a of the vibrating film 7 can be defined as follows. That is, a portion of the outer peripheral edge of the vibrating film 7 that corresponds to a portion of an outer peripheral edge of the cavity 5 between both ends of the slit 9 is the connection portion 7a. The vibrating film 7 is mainly deformable in the thickness direction (Z direction) of the supporting substrate 4. In this preferred embodiment, a supporting body 60 is constituted by the supporting substrate 4 and the frame body 8 and the vibrating film 7 is cantilever-supported by the supporting body 60. The supporting body 60 is an example of a "supporting body" of the present disclosure.

The first hydrogen barrier film 14A is formed on the vibrating film formation layer 6. The first hydrogen barrier film 14A is constituted, for example, of $Al_2O_3$ (alumina). A thickness of the first hydrogen barrier film 14A is approximately 20 nm to 100 nm.

On the first hydrogen barrier film 14A, the piezoelectric element 10 is formed such that at least a portion thereof is disposed above the vibrating film 7. The piezoelectric element 10 includes a lower electrode 11 that is formed on the first hydrogen barrier film 14A, a piezoelectric film 12 that is formed on the lower electrode 11, and an upper electrode 13 that is formed on the piezoelectric film 12. In this preferred embodiment, substantially an entirety of the piezoelectric element 10 is disposed on the vibrating film 7. The piezoelectric element 10 may be constituted of an element main portion that is disposed on the vibrating film 7 and an element extension portion that crosses the connection portion 7a from the element main portion and extends onto the frame body 8.

The lower electrode 11 and the upper electrode 13 are constituted, for example, of platinum, molybdenum, iridium, titanium, or other metal thin films having conductivity. A film thickness of the lower electrode 11 is approximately 200 nm and a film thickness of the upper electrode 13 is approximately 80 nm.

The lower electrode 11 has a main electrode portion 11A and an extension portion 11B of quadrilateral shapes in plan view. The main electrode portion 11A is of a quadrilateral shape having two sides parallel to the X direction and two sides parallel to the Y direction in plan view (see also FIG. 7B). The extension portion 11B projects in the −X direction from a portion near the +Y side of a side at the −X side among the two sides of the main electrode portion 11A parallel to the Y direction. The extension portion 11B is of a quadrilateral shape having two sides parallel to the X direction and two sides parallel to the Y direction in plan view. The main electrode portion 11A is disposed on the vibrating film 7. The extension portion 11B is disposed on the frame body 8 (more specifically, the first frame portion 8a).

The piezoelectric film 12 is constituted, for example, of lead zirconate titanate (PZT). The PZT may be doped with a minute amount of Ba, Sr, La, Nd, Nb, Ta, Sb, Bi, W, Mo, Ca, etc. The piezoelectric film 12 may instead be constituted of aluminum nitride (AlN), zinc oxide (ZnO), lead titanate ($PbTiO_3$), etc. A film thickness of the piezoelectric film 12 is approximately 2 μm. In plan view, the piezoelectric film 12 has a quadrilateral shape that is substantially similar to the main electrode portion 11A of the lower electrode 11 and is smaller than the main electrode portion 11A. In plan view, the upper electrode 13 has a quadrilateral shape that is substantially similar to the piezoelectric film 12 and is smaller than the piezoelectric film 12.

The second hydrogen barrier film 14B is formed on the vibrating film formation layer 6 such as to cover the piezoelectric element 10. The second hydrogen barrier film 14B is constituted, for example, of $Al_2O_3$ (alumina). A thickness of the second hydrogen barrier film 14B is approximately 20 nm to 100 nm. The first hydrogen barrier film 14A and the second hydrogen barrier film 14B are provided to prevent characteristics degradation of the piezoelectric film 12 due to hydrogen reduction. The second hydrogen barrier film 14B is an example of the "hydrogen barrier film" of the present disclosure.

The interlayer insulating film 15 is laminated on the second hydrogen barrier film 14B. The interlayer insulating film 15 is constituted, for example, of a film (TEOS film) that contains tetraethoxysilane (TEOS). A thickness of the interlayer insulating film 15 is approximately 0.2 μm to 1.5 μm. An upper wiring 18 and a lower wiring 19 are formed on the interlayer insulating film 15.

The upper wiring 18 is constituted of a connection portion 18a that is disposed above a −X side end portion of the upper electrode 13, an intermediate portion 18b that extends in the −X direction from the connection portion 18a, and an upper pad portion 18c that is formed at a −X side end of the intermediate portion 18b. The connection portion 18a is of a rectangular shape that is elongate in the Y direction in plan view. Between the connection portion 18a and the upper electrode 13, a plurality of contact holes 16 that penetrate continuously through the interlayer insulating film 15 and the second hydrogen barrier film 14B are formed at intervals in the Y direction. Portions of the connection portion 18*a* enter into the respective contact holes 16 and are connected to the upper electrode 13 inside the contact holes 16.

The intermediate portion 18*b* is disposed such as to straddle a length intermediate portion of the connection portion 7*a* of the vibrating film 7 in plan view. A +X side end of the intermediate portion 18*b* is joined to the connection portion 18*a* and a −X side end of the intermediate portion 18*b* is joined to the upper pad portion 18*c*. The upper pad portion 18*c* is of a square shape that is wider than the intermediate portion 18*b* in plan view. The upper pad portion 18*c* is disposed on the frame body 8 (more specifically, the first frame portion 8*a*) at an outside of the cavity 5 (at the −X direction side with respect to the cavity 5).

The lower wiring 19 is constituted of a connection portion 19*a* that is disposed on the extension portion 11B of the lower electrode 11, an intermediate portion 19*b* that extends in the −Y direction from the connection portion 19*a*, and a lower pad portion 19*c* that is formed at a −Y side end of the intermediate portion 19*b*. The lower pad portion 19*c* of the lower wiring 19 is disposed at the +Y side with respect to the upper pad portion 18*c* of the upper wiring 18.

The connection portion 19*a* is of a rectangular shape that is long in the Y direction in plan view. Between the connection portion 19*a* and the extension portion 11B, a plurality of contact holes 17 that penetrate continuously through the interlayer insulating film 15 and the second hydrogen barrier film 14B are formed at intervals in the X direction and the Y direction. Portions of the connection portion 19*a* enter into the respective contact holes 17 and are connected to the lower electrode 11 inside the contact holes 17.

A +Y side end of the intermediate portion 19*b* is joined to the connection portion 19*a* and a −Y side end of the intermediate portion 19*b* is joined to the lower pad portion 19*c*. The lower pad portion 19*c* is of a square shape that is wider than the intermediate portion 19*b* in plan view. The lower pad portion 19*c* is disposed on the frame body 8 (more specifically, the first frame portion 8*a*) at the outside of the cavity 5 (at the −X direction side with respect to the cavity 5). The upper wiring 18 and the lower wiring 19 may be constituted of a metal material that contains Al (aluminum). A thickness of these wirings 18 and 19 is approximately 1 μm.

The passivation film 20 is formed on the interlayer insulating film 15 such as to cover the upper wiring 18 and the lower wiring 19. The passivation film 20 is constituted, for example, of a film (TEOS film) that contains tetraethoxysilane (TEOS). A thickness of the passivation film 20 is approximately 0.1 μm to 1.0 μm.

The passivation film 20 is formed across substantially an entire area of a region directly above the frame body 8. However, in this region, an upper pad opening 21 that exposes a portion of the upper pad portion 18*c* and a lower pad opening 22 that exposes a portion of the lower pad portion 19*c* are formed in the passivation film 20.

In a region directly above the vibrating film 7, the passivation film 20 is formed just in a region directly above an end portion (hereinafter referred to as a "wiring region") of the vibrating film 7 at the −X side at which the upper wiring 18 is present. In other words, in the region directly above the vibrating film 7, an opening 23 is formed in the passivation film 20 in a region excluding the wiring region (see also FIG. 7F). In the wiring region, the contact holes 16 are formed in a laminated film of the interlayer insulating film 15 and the second hydrogen barrier film 14B. Here, the opening 23 does not have to be formed in the passivation film 20.

Also, as with the passivation film 20, the interlayer insulating film 15 may also be formed just in the wiring region in the region directly above the vibrating film 7.

In the following description, the first hydrogen barrier film 14A, the second hydrogen barrier film 14B, the interlayer insulating film 15, and the passivation film 20 may be referred to collectively at times as an insulating film 30. The insulating film 30 is included in the substrate assembly 2.

A cantilever 40 of quadrilateral shape in plan view is constituted by the vibrating film 7 and members formed on the vibrating film 7. The cantilever 40 includes the vibrating film 7, the portion of the piezoelectric element 10 disposed on the vibrating film 7 (in this preferred embodiment, a portion of the entirety of the piezoelectric element 10 excluding the extension portion 11B of the lower electrode 11), and the insulating film 30 on the vibrating film 7. In this preferred embodiment, the cantilever 40 also includes the wiring disposed on the vibrating film 7. The cantilever 40 has a fixed end 40*a* at an edge portion (the connection portion 7*a*) of the first side 5*a* of the cavity 5 and this fixed end 40*a* is supported by the supporting substrate 4.

In plan view, the cantilever 40 has, in a vicinity of the third side Sc of the cavity 5, a free end 40*b* at a position separated by just a predetermined distance toward an inside of the cavity 5 from the third side Sc. In plan view, a side of the cantilever 40 at the second side 5*b* side of the cavity 5 is separated toward the inside of the cavity 5 from the second side 5*b*. In plan view, a side of the cantilever 40 at the fourth side 5*d* side of the cavity 5 is separated toward the inside of the cavity 5 from the fourth side 5*d*.

The protective substrate 3 is constituted of a silicon substrate. The protective substrate 3 is disposed on the substrate assembly 2. The protective substrate 3 is of quadrilateral annular shape in plan view and includes a first wall portion 3*a* that is disposed above the first frame portion 8*a* of the frame body 8, a second wall portion 3*b* that is disposed above the second frame portion 8*b* of the frame body 8, a third wall portion 3*c* that is disposed above the third frame portion 8*c* of the frame body 8, and a fourth wall portion 3*d* that is disposed above the fourth frame portion 8*d* of the frame body 8. However, a cutout portion 3*e* in which the first wall portion 3*a* is not present is formed in a length intermediate portion of the first wall portion 3*a*. In other words, the first wall portion 3*a* has, at a location corresponding to the length intermediate portion of the connection portion 7*a*, the cutout portion 3*e* in which the first wall portion 3*a* is not present. The protective substrate 3 is bonded to the frame body 8 via the insulating film 30 and an adhesive 51.

In this preferred embodiment, the cutout portion 3*e* is formed in a length central portion of the first wall portion 3*a*. In the cutout portion 3*e*, the passivation film 20, a portion of the upper pad portion 18*c*, and a portion of the lower pad portion 19*c* are exposed. In this preferred embodiment, the upper pad portion 18*c* and the lower pad portion 19*c* can be disposed at positions comparatively close to the connection portion 7*a* because the first wall portion 3*a* is not present at the +X direction side of the upper pad portion 18*c* and the lower pad portion 19*c*. Details of the reason for this shall be described later.

If, for example, the transducer 1 is used as a speaker, when a voltage is applied between the lower electrode 11 and the upper electrode 13, the piezoelectric film 12 deforms due to an inverse piezoelectric effect. The cantilever 40 thereby deforms with the fixed end 40*a* as a fulcrum. When a voltage that is in accordance with an audio signal is applied continuously between the lower electrode 11 and the upper electrode 13, the cantilever 40 vibrates such that the free end 40*b* of the cantilever 40 moves reciprocally in the Z direction. Due to such vibration of the cantilever 40, air surrounding the cantilever 40 vibrates and a sound wave is generated. The sound wave propagates to an external space via a space surrounded by the protective substrate 3.

A displacement amount of each portion of the cantilever 40 is greater the closer the portion is to the free end 40*b* and smaller the closer the portion is to the fixed end 40*a*. Therefore, an air leak is greater for a position closer to the free end 40*b* of the cantilever 40 and smaller for a position closer to the fixed end 40*a*. An influence of the air leak is smallest at a central portion of the fixed end 40*a* of the cantilever 40. Therefore, even if the cutout portion 3*e* is formed in the length intermediate portion of the first wall portion 3*a* that is close to the fixed end 40*a* of the cantilever 40 as in the present preferred embodiment, this has hardly any influence on characteristics of the transducer 1.

Figure 4:
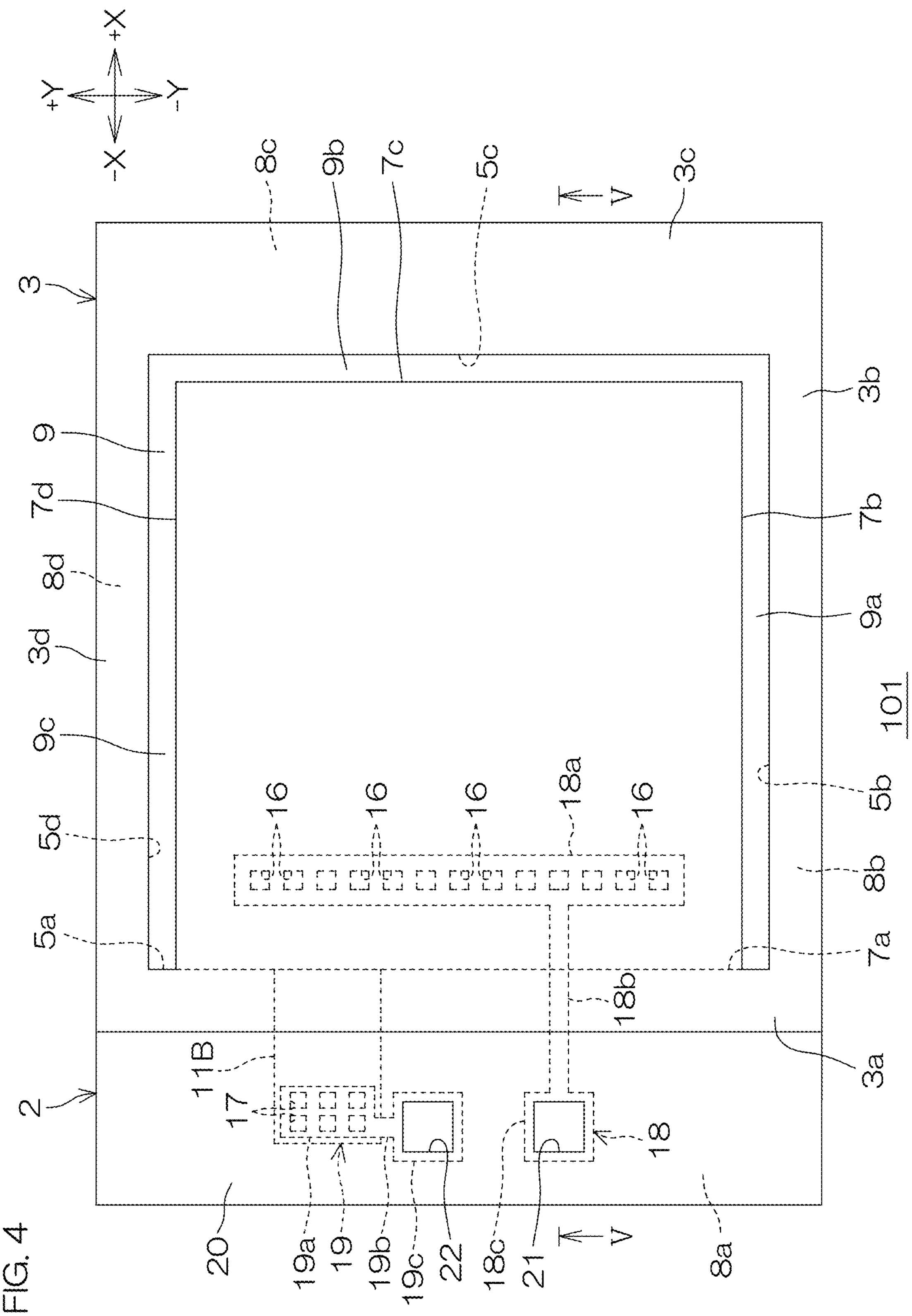
FIG. 4 is an illustrative plan view of a transducer according to a comparative example.
Figure 5:
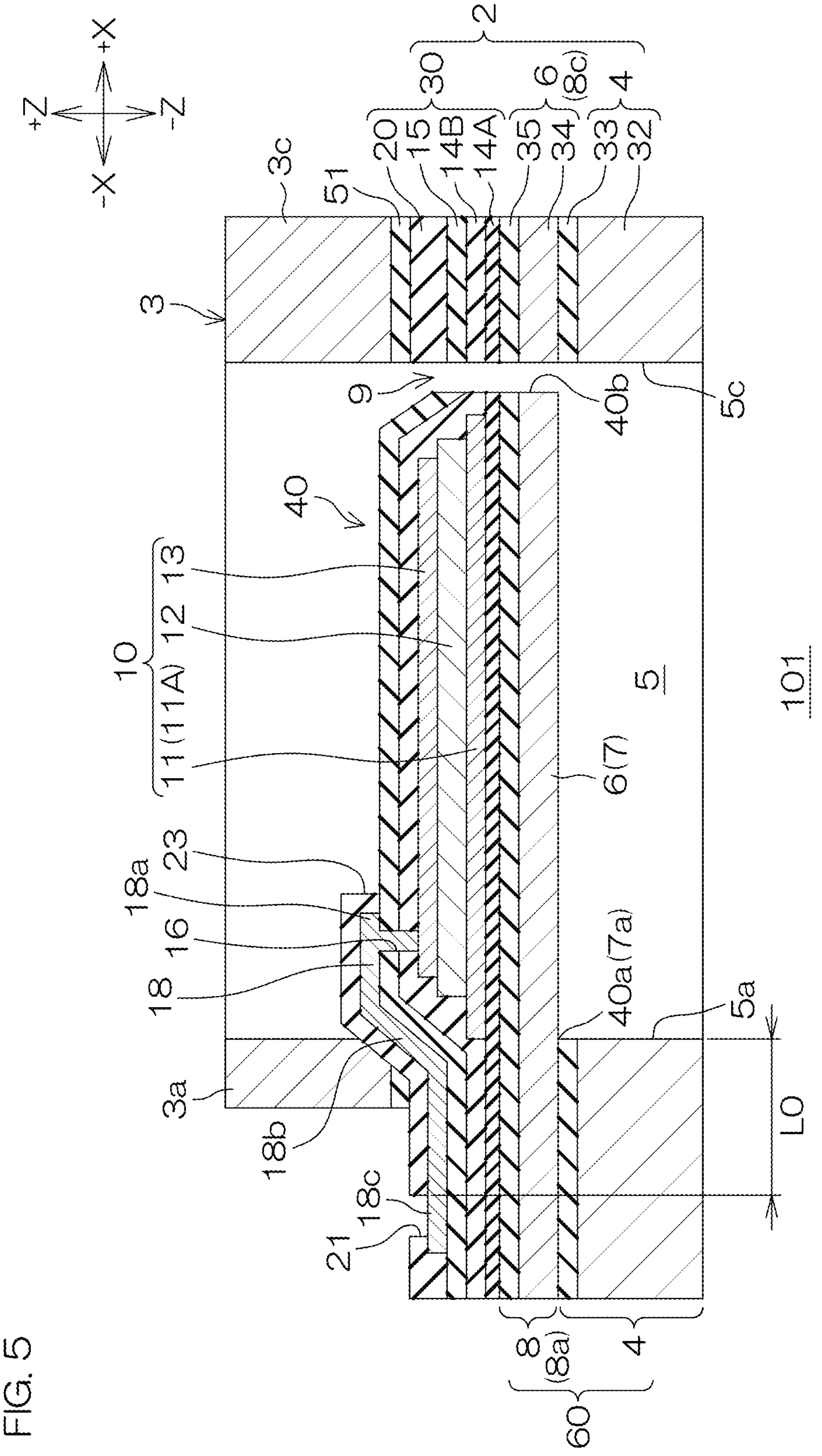
FIG. 5 is an illustrative sectional view taken along line V-V of FIG. 4.

FIG. 4 is an illustrative plan view of a transducer according to a comparative example. FIG. 5 is an illustrative sectional view taken along line V-V of FIG. 4. In FIG. 4, portions corresponding to respective portions of FIG. 1 described above are indicated with the same reference signs attached as in FIG. 1. In FIG. 5, portions corresponding to respective portions of FIG. 2 described above are indicated with the same reference signs attached as in FIG. 2.

In comparison to the transducer 1 of the present preferred embodiment, a transducer 101 according to the comparative example differs in the point that a thickness (length in the X direction) of the first wall portion 3*a* of the protective substrate 3 is formed thinly, the point that a cutout portion is not formed in a length intermediate portion of the first wall portion 3*a*, and the point that a distance from the connection portion 7*a* to the upper pad portion 18*c* and the lower pad portion 19*c* is large. Due to these differences, a length in the X direction of the transducer 101 is longer than that of the transducer 1 of the present preferred embodiment.

With the transducer 101 according to the comparative example, the upper pad portion 18*c* and the lower pad portion 19*c* (hereinafter, these shall be referred to collectively as the "pad portions 18*c* and 19*c*") are disposed at the −X direction side of the first wall portion 3*a*. The transducer is housed inside an electronic equipment case together with a signal processing chip. One ends of wires for connecting the signal processing chip and the transducer 101 are connected by wire bonding to the pad portions 18*c* and 19*c*.

In order to perform wire bonding on the pad portions 18*c* and 19*c*, the protective substrate 3 must be arranged such as not to be present in a region larger than the pad portions 18*c* and 19*c* (for example, in a region of radius within a predetermined length (for example, 250 μm) centered at a center of each of the pad portions 18*c* and 19*c*). Therefore, with the transducer 101 according to the comparative example, an X-direction distance from the first wall portion 3*a* of the protective substrate 3 to the pad portions 18*c* and 19*c* must be set to not less than a predetermined distance. Therefore, an X-direction distance L0 from the connection portion 7*a* to the pad portions 18*c* and 19*c* becomes comparatively large.

In contrast, with the transducer 1 according to the present preferred embodiment, the first wall portion 3*a* has, at the location corresponding to the length intermediate portion of the connection portion 7*a*, the cutout portion 3*e* in which the wall portion is not present. Therefore, an X-direction distance Li (see FIG. 2) from the connection portion 7*a* to the pad portions 18*c* and 19*c* can be made short in comparison to the L0 (see FIG. 5) of the comparative example. Thereby, with the present preferred embodiment, the length in the X direction of the transducer 1 can be made shorter than the length in the X direction of the transducer 101 of the comparative example and therefore, size reduction can be achieved in comparison to the transducer 101 of the comparative example.

FIG. 6A to FIG. 6H are illustrative sectional views sequentially showing a manufacturing process of the transducer 1 of FIG. 1. FIG. 7A to FIG. 7G are illustrative sectional views sequentially showing the manufacturing process of the transducer 1.

Figure 6A:
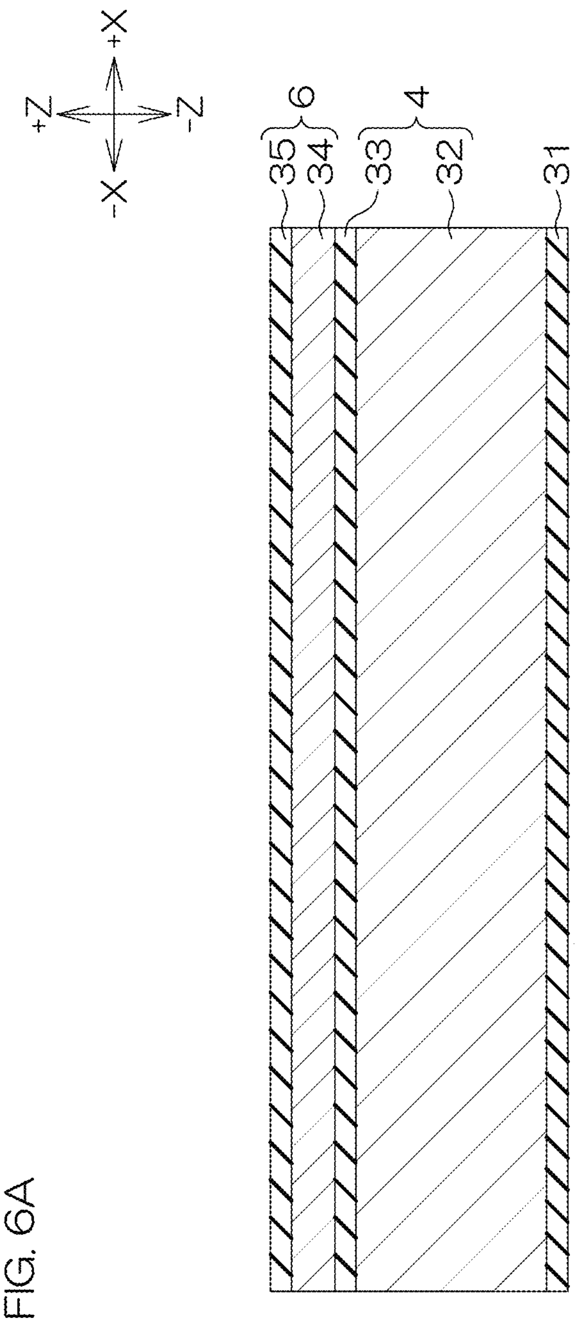
FIG. 6A is an illustrative sectional view showing a portion of a manufacturing process of the transducer of FIG. 1.
Figure 7A:
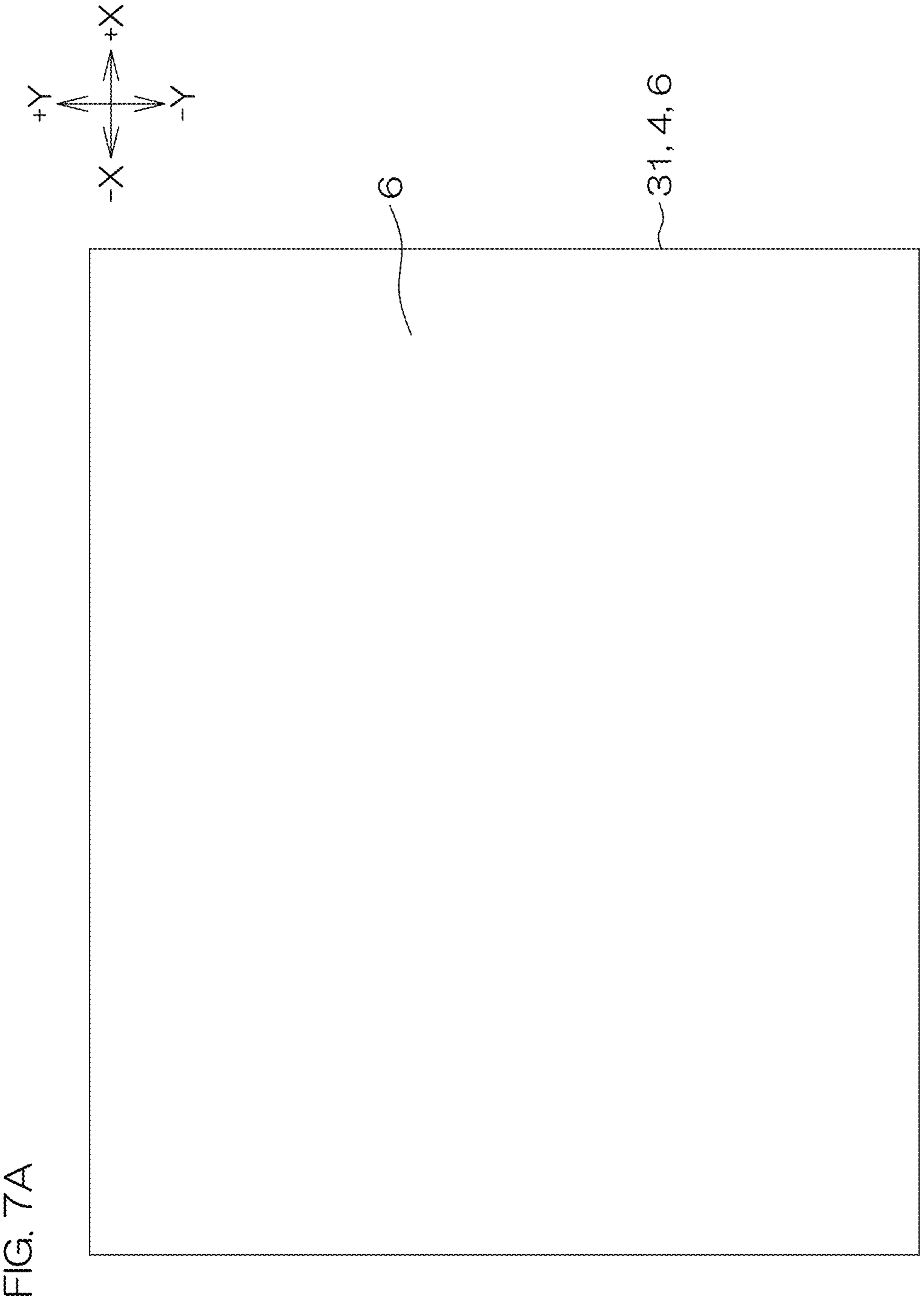
FIG. 7A is an illustrative plan view showing the manufacturing process of the transducer of FIG. 1.

As shown in FIG. 6A and FIG. 7A, a thermal oxidation treatment is performed on an SIO substrate. The SIO substrate includes the silicon substrate 32, the oxide film layer 33 formed on the front surface of the preceding, and the silicon layer 34 formed on the front surface of the preceding. By the thermal oxidation treatment, the silicon oxide film 35 is formed on the front surface (+Z side surface) of the silicon layer 34 at an opposite side to the oxide film layer 33 and a silicon oxide film 31 is formed on a surface (−Z side surface) of the silicon substrate 32 at an opposite side to the oxide film layer 33. The supporting substrate 4 is constituted by the silicon substrate 32 and the oxide film layer 33 and the vibrating film formation layer 6 is constituted by the silicon layer 34 and the silicon oxide film 35.

Figure 6B:
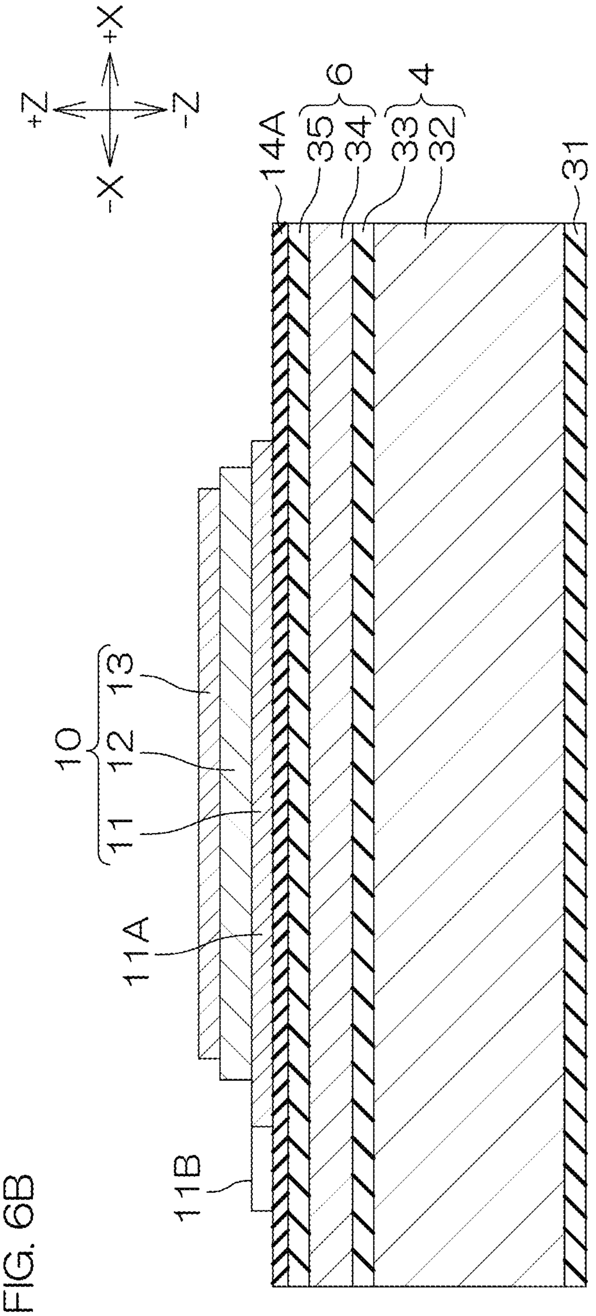
FIG. 6B is an illustrative sectional view showing a step subsequent to that of FIG. 6A.
Figure 7B:
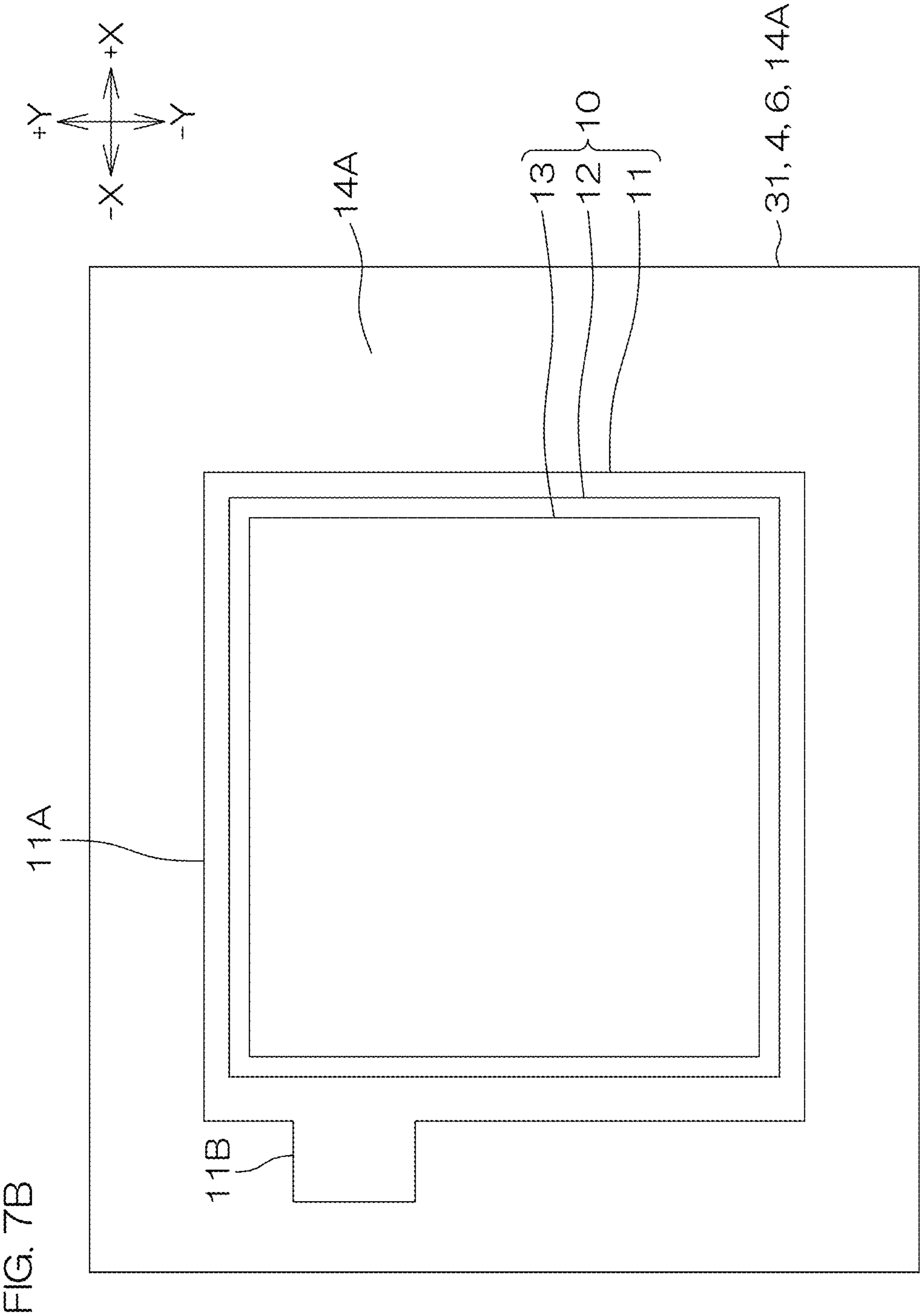
FIG. 7B is an illustrative plan view showing a step subsequent to that of FIG. 7A.

Next, as shown in FIG. 6B and FIG. 7B, the first hydrogen barrier film 14A is formed on the silicon oxide film 35. The first hydrogen barrier film 14A is constituted, for example, of an alumina ($Al_2O_3$) film. Thereafter, a lower electrode film that is a material film of the lower electrode 11, a piezoelectric material film that is a material film of the piezoelectric film 12, and an upper electrode film that is a material film of the upper electrode 13 are formed in that order on the first hydrogen barrier film 14A. The upper electrode 13, the piezoelectric film 12, and the lower electrode 11 are then formed by the upper electrode film, the piezoelectric material film, and the lower electrode film being patterned, for example, in that order by photolithography and etching. The piezoelectric element 10 is thereby formed on the first hydrogen barrier film 14A.

Figure 6C:
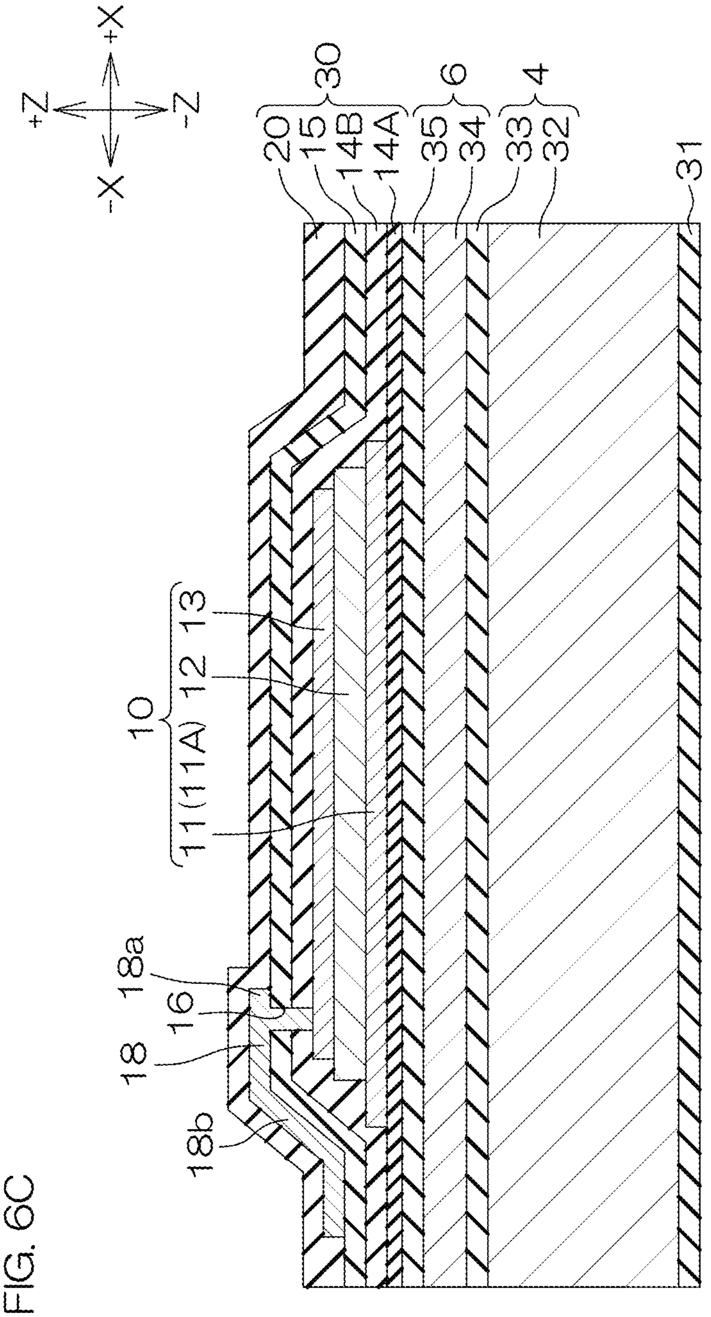
FIG. 6C is an illustrative sectional view showing a step subsequent to that of FIG. 6B.
Figure 7C:
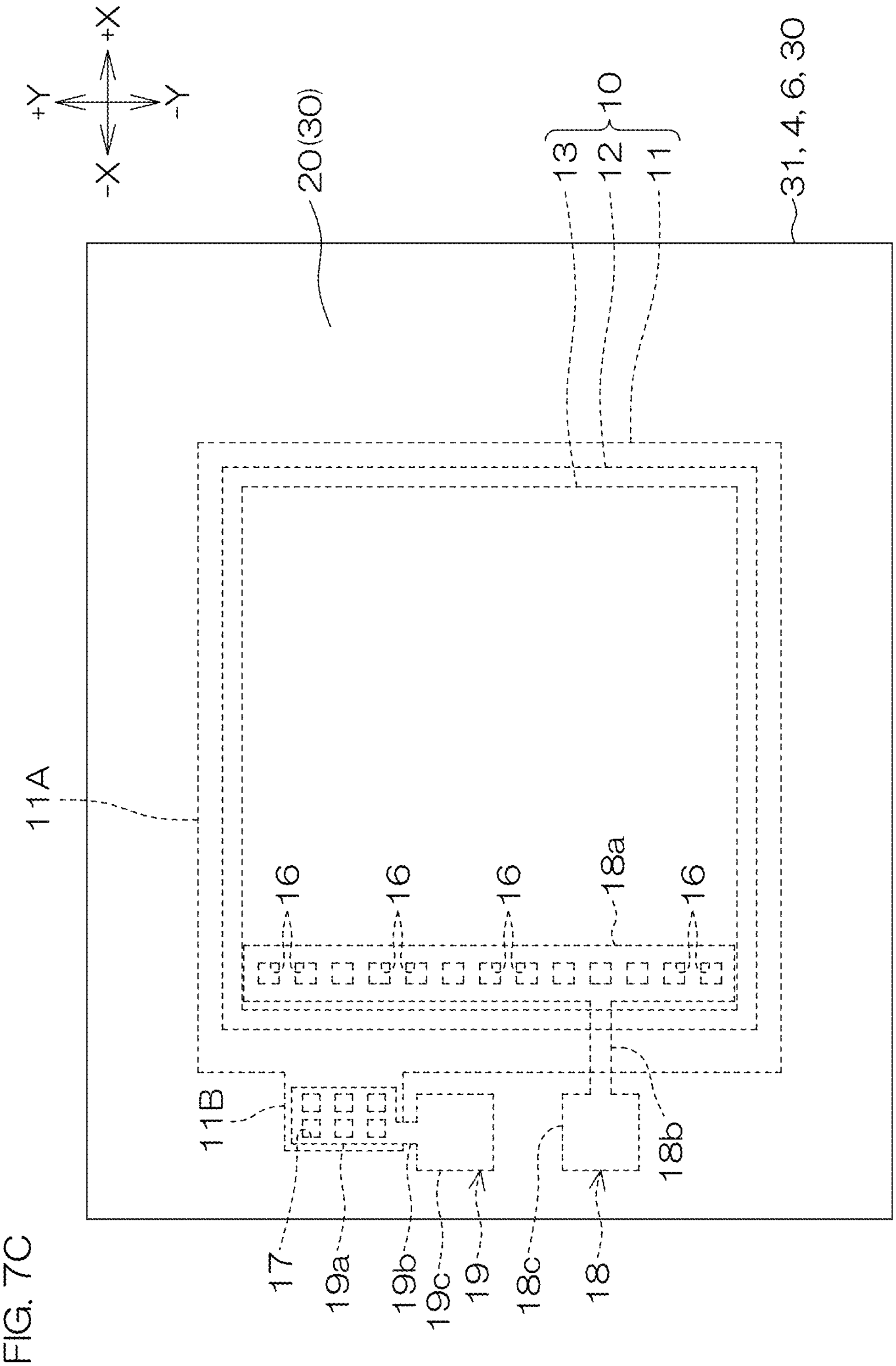
FIG. 7C is an illustrative plan view showing a step subsequent to that of FIG. 7B.

Next, as shown in FIG. 6C and FIG. 7C, the second hydrogen barrier film 14B that covers an exposed surface of the first hydrogen barrier film 14A and an exposed surface of the piezoelectric element 10 is formed on the first hydrogen barrier film 14A. The second hydrogen barrier film 14B is constituted, for example, of an alumina ($Al_2O_3$) film. The interlayer insulating film 15 is formed on an entire surface on the second hydrogen barrier film 14B. The contact holes 16 and 17 are then formed by etching the interlayer insulating film 15 and the second hydrogen barrier film 14B continuously.

Next, a wiring film that is a material film of the upper wiring 18 and the lower wiring 19 is formed on the interlayer insulating film 15 including interiors of the contact holes 16 and 17. Thereafter, the upper wiring 18 (18*a*, 18*b*, and 18*c*) and the lower wiring 19 (19*a*, 19*b*, and 19*c*) are formed by the wiring film being patterned by photolithography and etching. The passivation film 20 is then formed on the interlayer insulating film 15 such as to cover the upper wiring 18 and the lower wiring 19. The interlayer insulating film 15 and the passivation film 20 are constituted, for example, of films (TEOS films) containing tetraethoxysilane (TEOS).

Figure 6D:
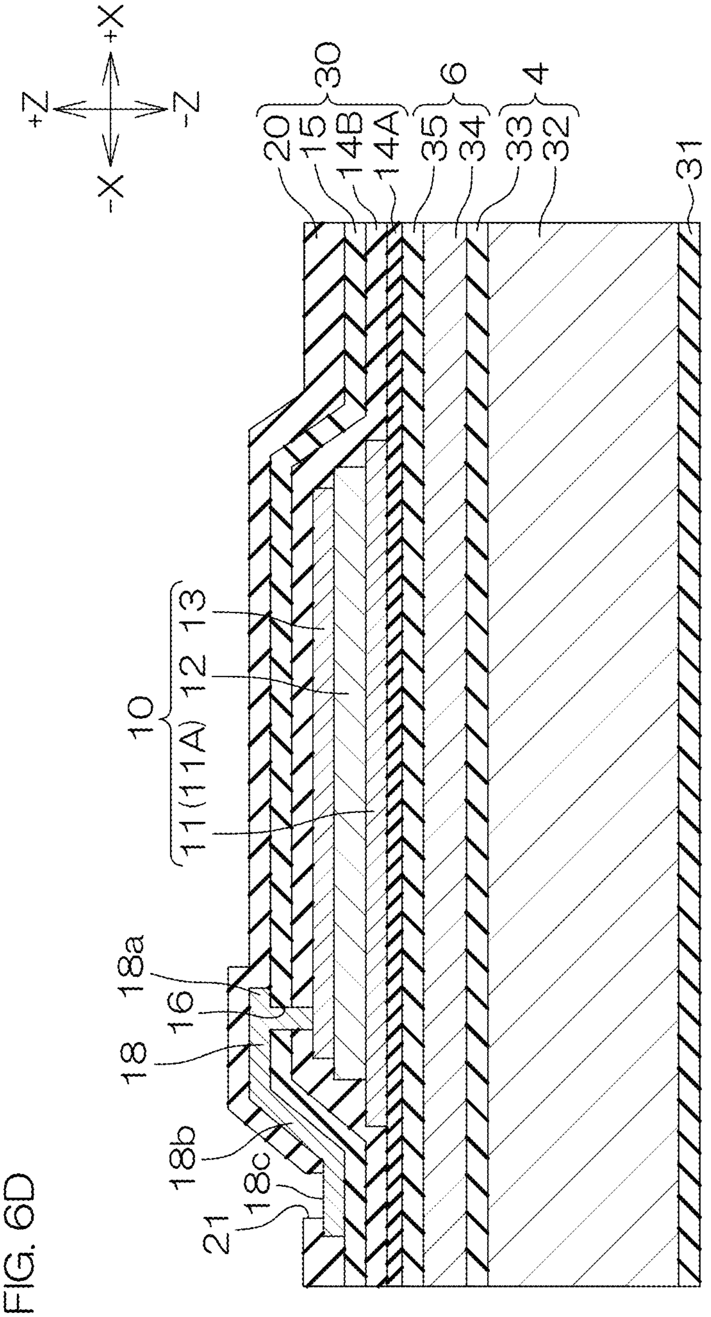
FIG. 6D is an illustrative sectional view showing a step subsequent to that of FIG. 6C.
Figure 7D:
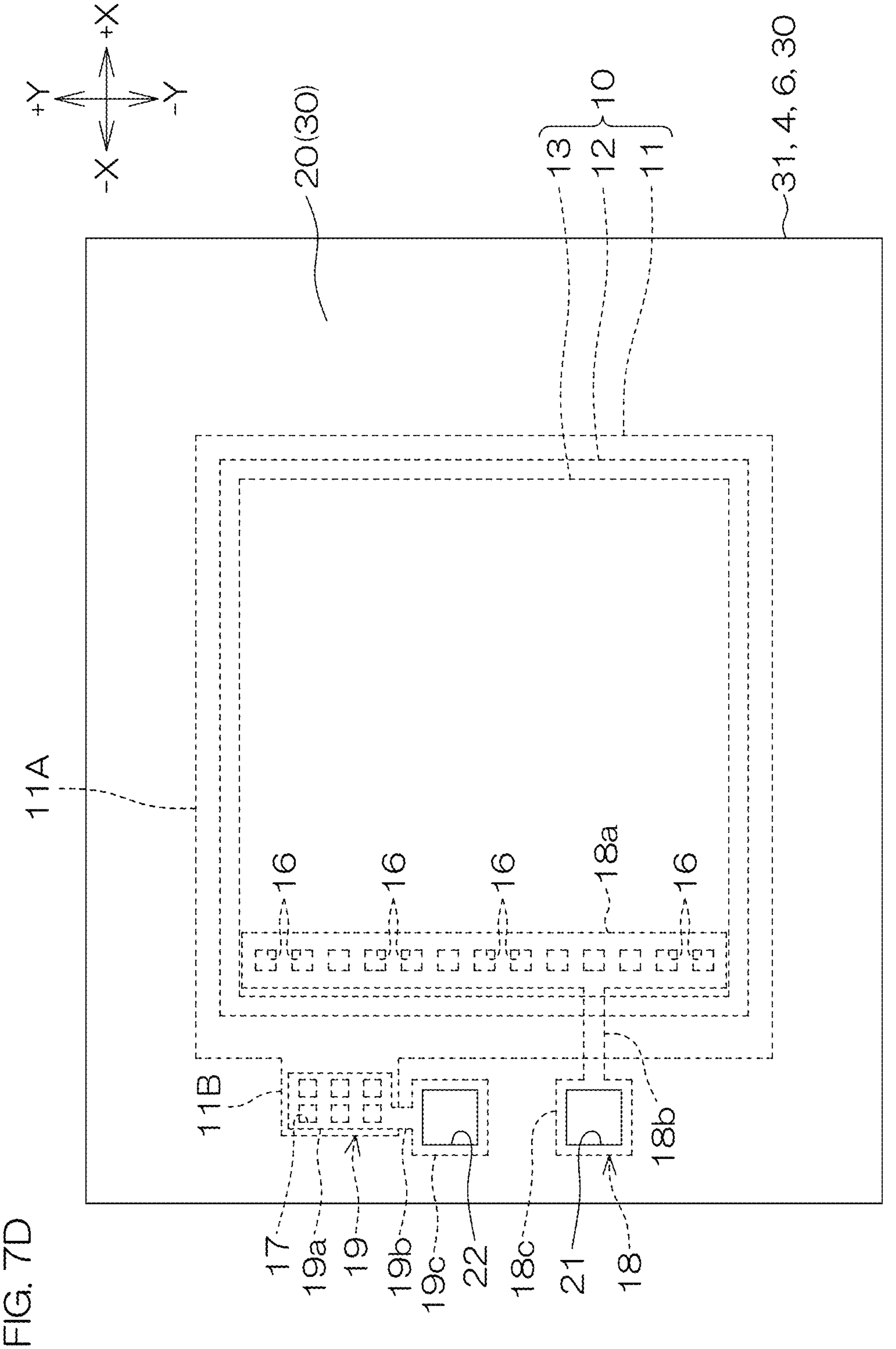
FIG. 7D is an illustrative plan view showing a step subsequent to that of FIG. 7C.

Next, as shown in FIG. 6D and FIG. 7D, the upper pad opening 21 that exposes a portion of the upper pad portion 18*c* and the lower pad opening 22 that exposes a portion of the lower pad portion 19*c* are formed in the passivation film 20 by photolithography and etching.

Figure 6E:
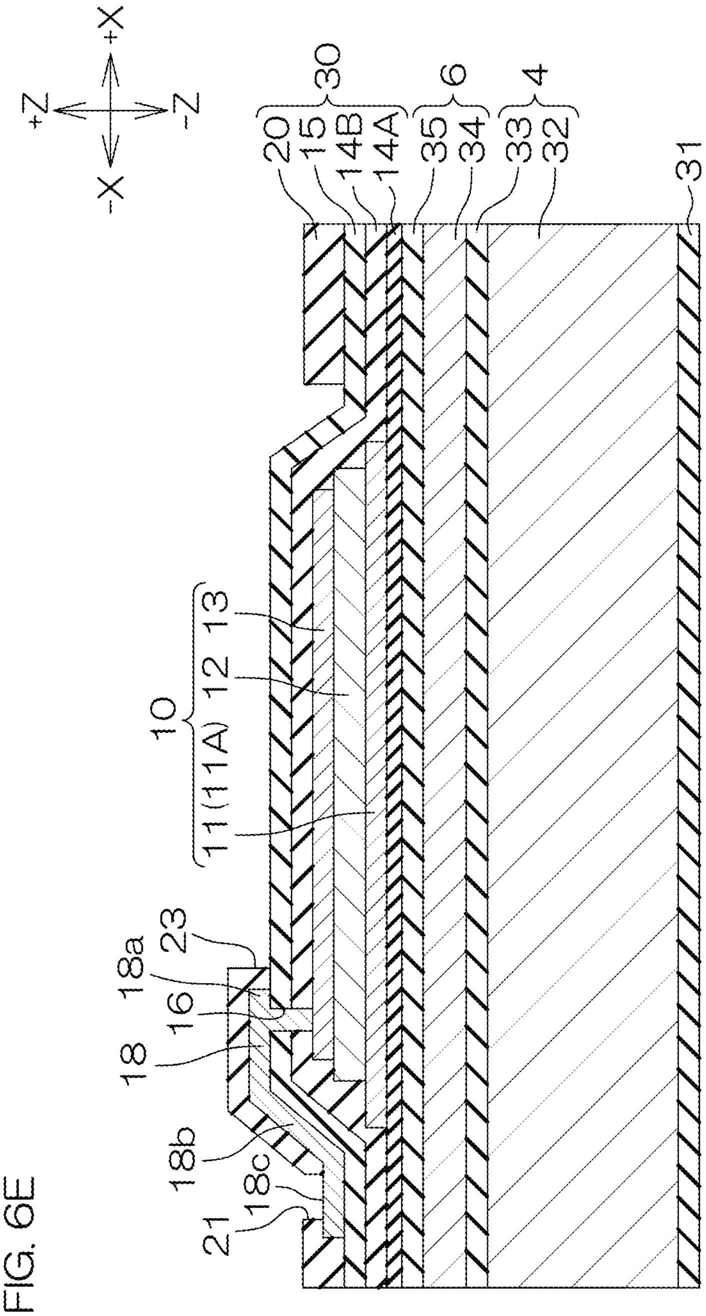
FIG. 6E is an illustrative sectional view showing a step subsequent to that of FIG. 6D.
Figure 7E:
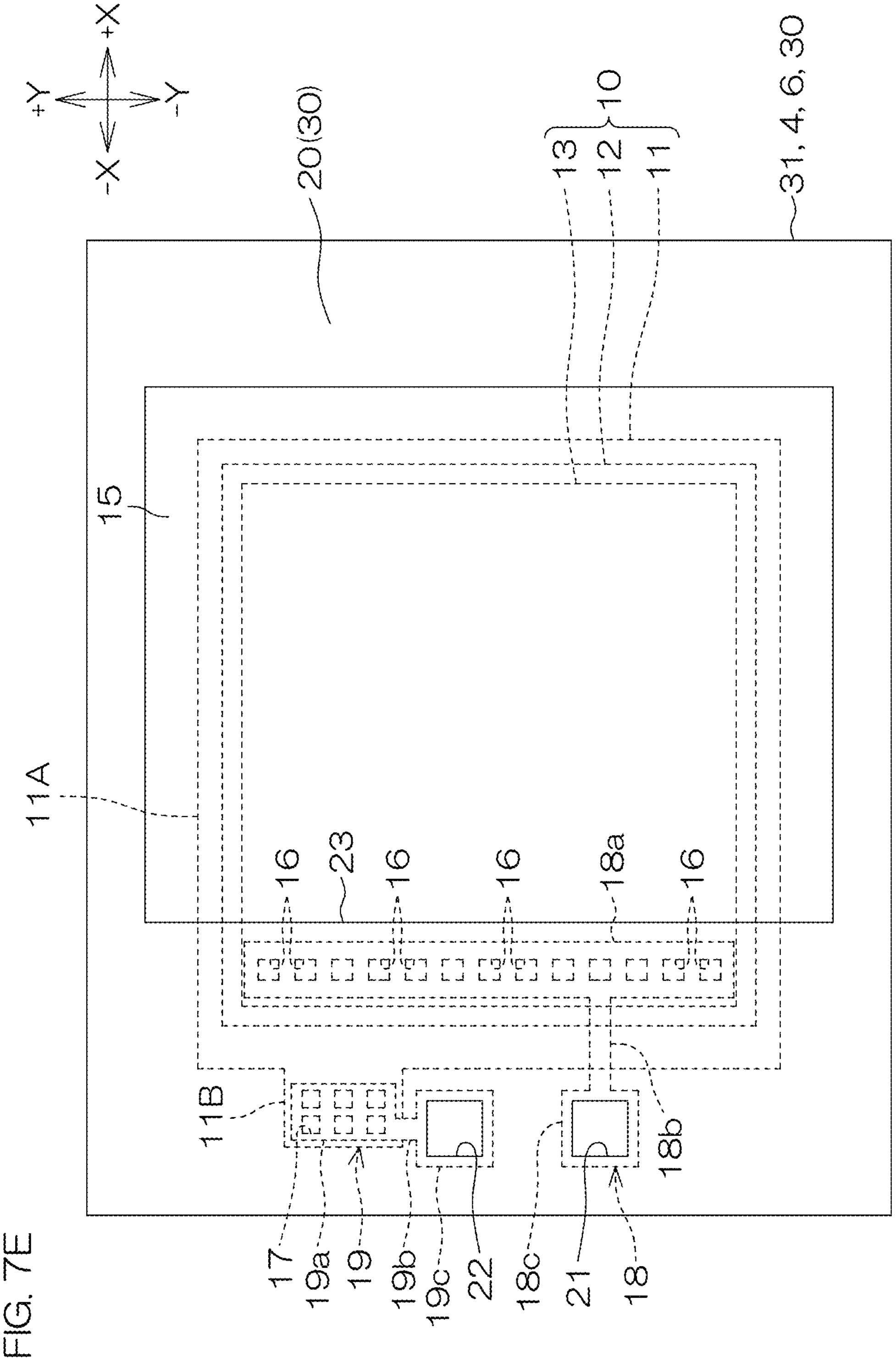
FIG. 7E is an illustrative plan view showing a step subsequent to that of FIG. 7D.

Next, as shown in FIG. 6E and FIG. 7E, the opening 23 is formed in the passivation film 20 by photolithography and etching. Here, this step may be omitted.

Figure 6F:
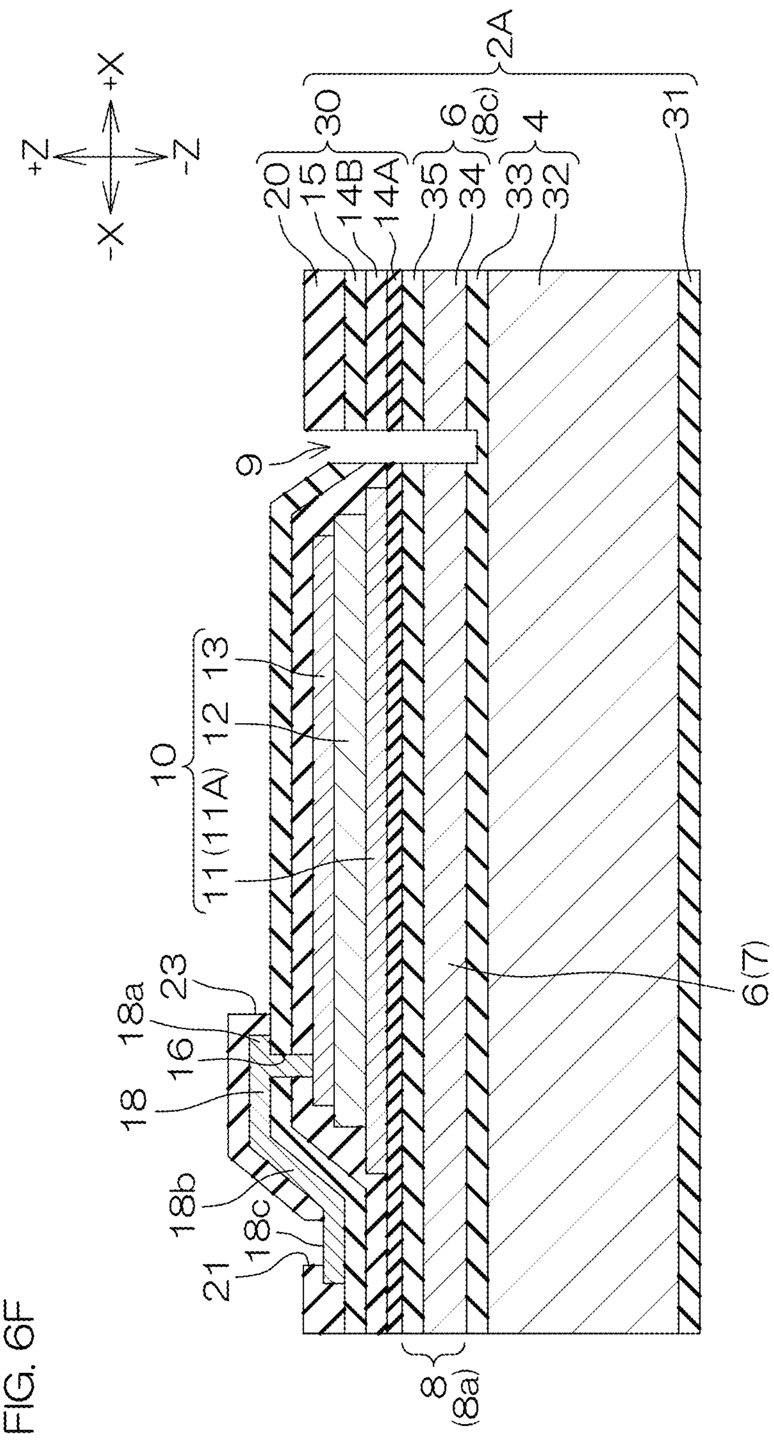
FIG. 6F is an illustrative sectional view showing a step subsequent to that of FIG. 6E.
Figure 7F:
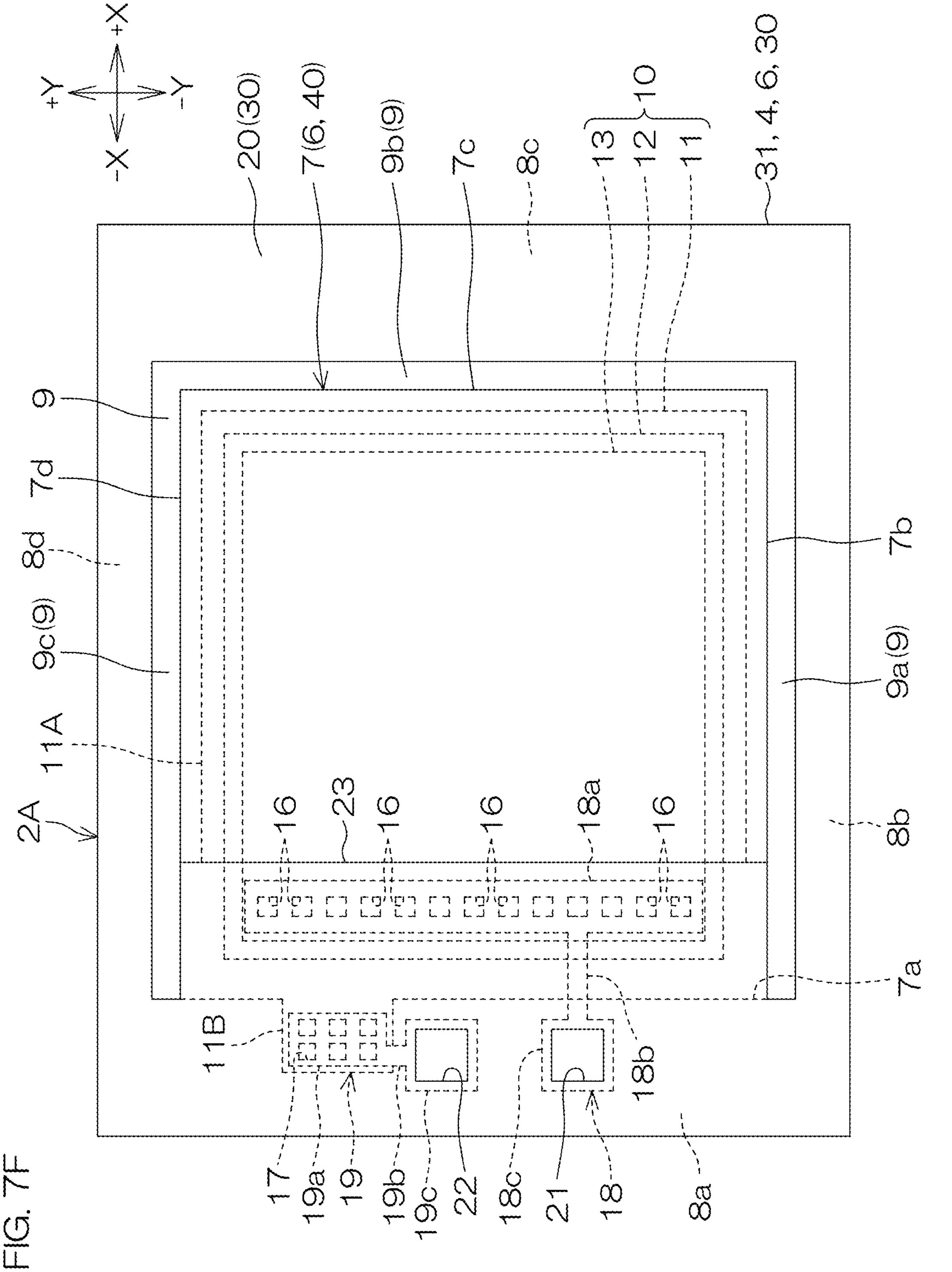
FIG. 7F is an illustrative plan view showing a step subsequent to that of FIG. 7E.

Next, as shown in FIG. 6F and FIG. 7F, the slit 9 that penetrates continuously through the passivation film 20 and the interlayer insulating film 15 or the interlayer insulating film 15, the second hydrogen barrier film 14B, the first hydrogen barrier film 14A, the vibrating film formation layer 6 (the silicon oxide film 35 and the silicon layer 34), and the oxide film layer 33 and reaches the oxide film layer 33 is formed by photolithography and etching.

By the slit 9 being formed, the frame body 8 (8*a*, 8*b*, 8*c*, and 8*d*) constituted of a peripheral edge portion of the vibrating film formation layer 6 and the vibrating film 7 that is constituted of a central portion of the vibrating film formation layer 6 and with which a portion of the outer peripheral edge is connected to the frame portion 8 are obtained. Also, a work-in-process substrate assembly 2A with which the cavity 5 is not formed is obtained.

Figure 6G:
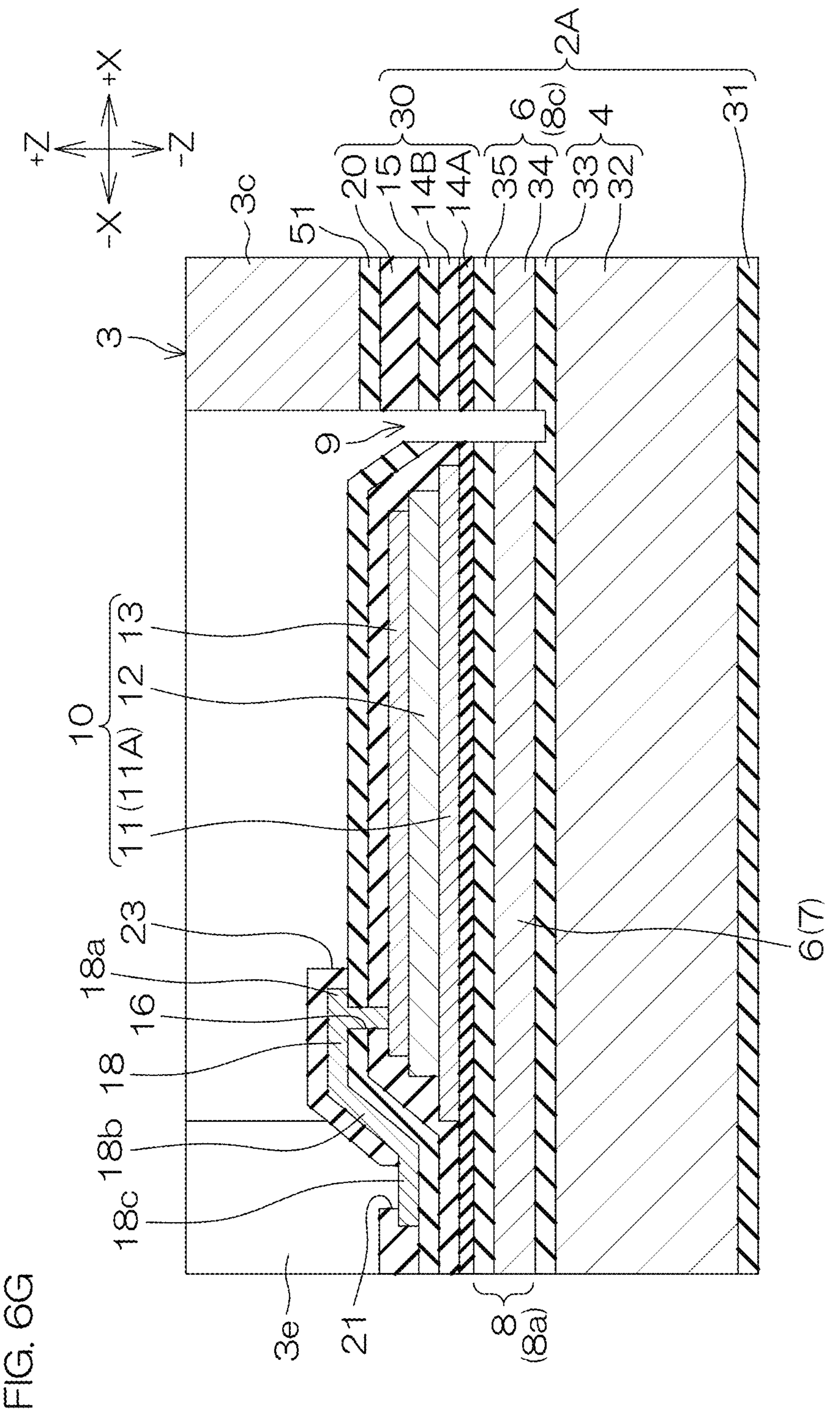
FIG. 6G is an illustrative sectional view showing a step subsequent to that of FIG. 6F.
Figure 7G:
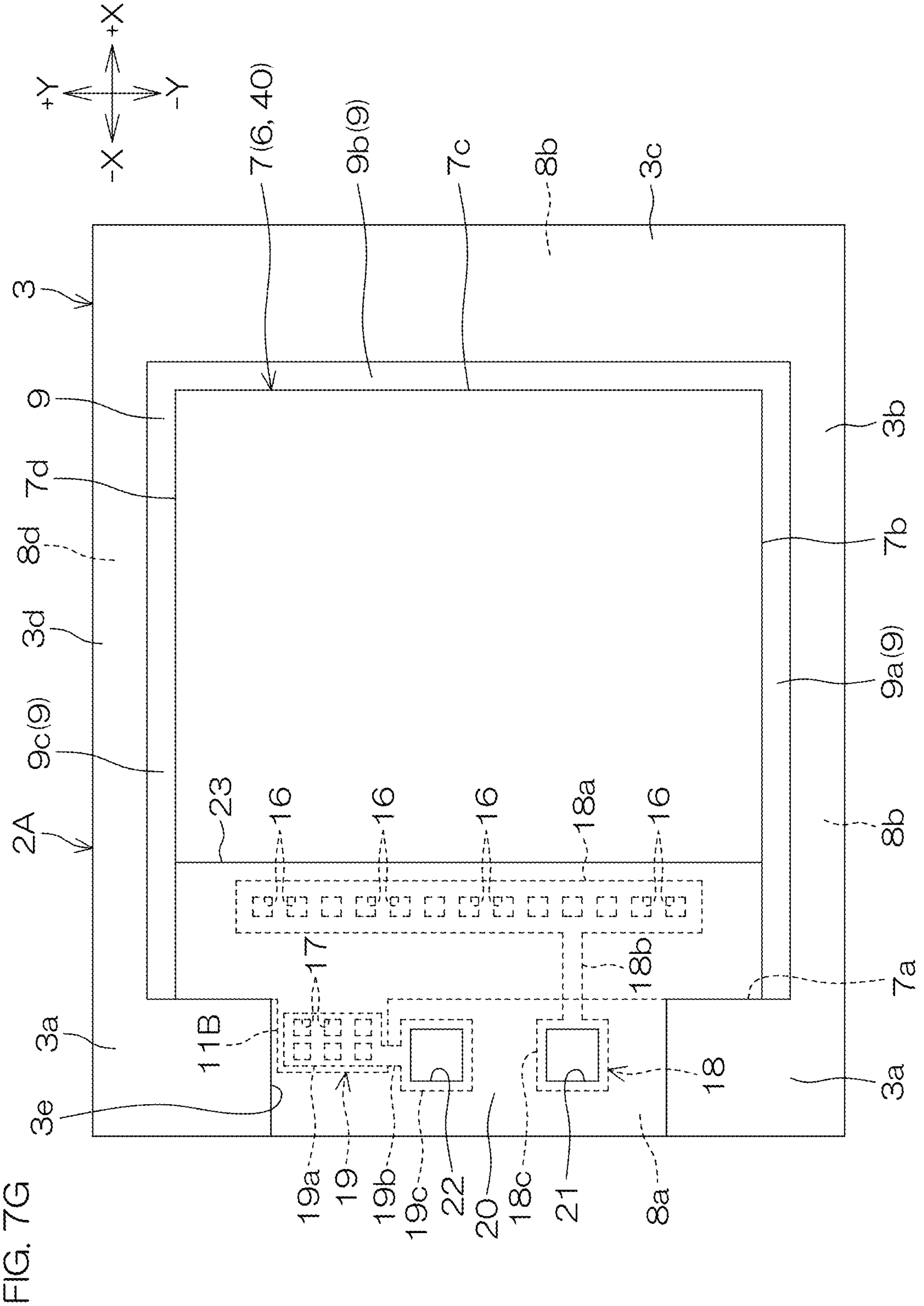
FIG. 7G is an illustrative plan view showing a step subsequent to that of FIG. 7F.

Next, as shown in FIG. 6G and FIG. 7G, the adhesive 51 is coated on a surface of the protective substrate 3 that faces the work-in-process substrate assembly 2A and the protective substrate 3 is fixed to the work-in-process substrate assembly 2A.

Figure 6H:
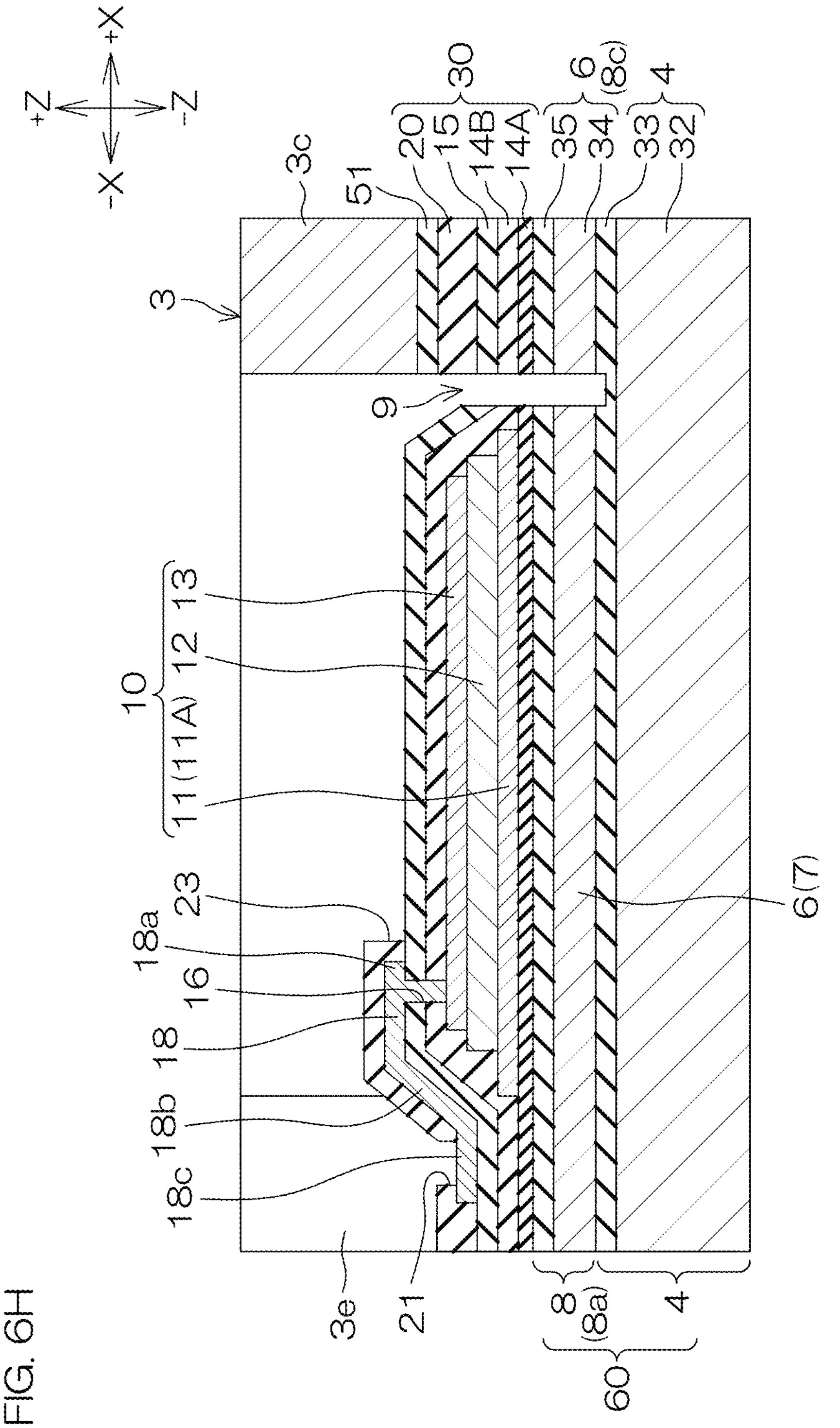
FIG. 6H is an illustrative sectional view showing a step subsequent to that of FIG. 6G.

Next, as shown in FIG. 6H, rear surface grinding for thinning the silicon substrate 32 is performed. That is, the silicon substrate 32 is thinned by the silicon oxide film 31 and the silicon substrate 32 being polished from a surface of the silicon oxide film 31 at an opposite side to the silicon substrate 32.

Lastly, a resist mask (not shown) having an opening corresponding to a formation planned region of a cavity 5 is formed on a rear surface (−Z side surface) side of the silicon substrate 32. The silicon substrate 32 is etched from the rear surface using the resist mask as a mask. The transducer 1 shown in FIG. 1 to FIG. 3 is thereby obtained.

Figure 8:
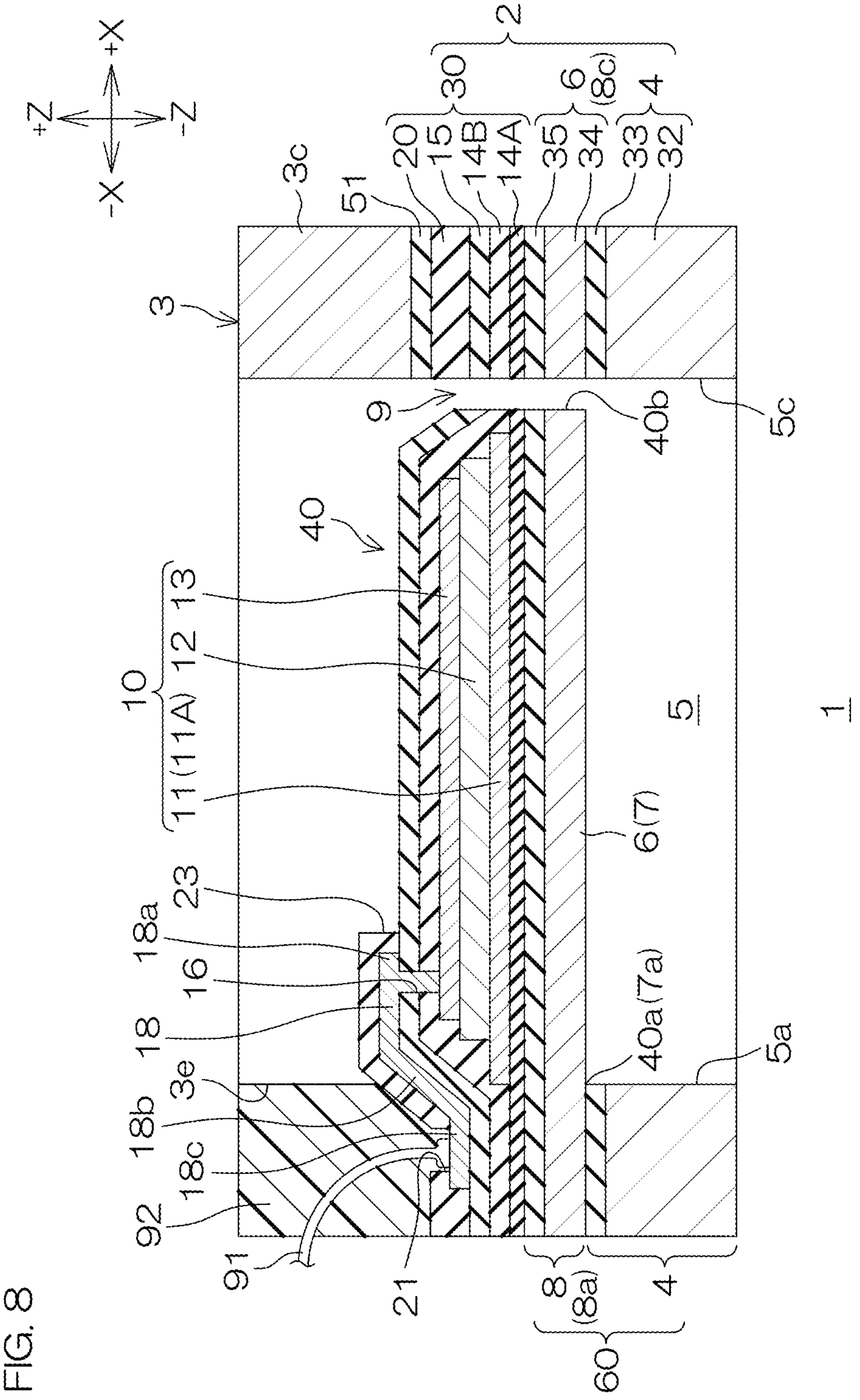
FIG. 8 is an illustrative sectional view showing a modification example and is a sectional view corresponding to the section plane of FIG. 2.

As shown in FIG. 8, after one ends of wires 91 are connected to the pad portions 18*c* and 19*c*, a resin 92 may be embedded in the cutout portion 3*e*. By doing so, air leak due to the cutout portion 3*e* can be suppressed when the cantilever 40 vibrates.

Figure 9:
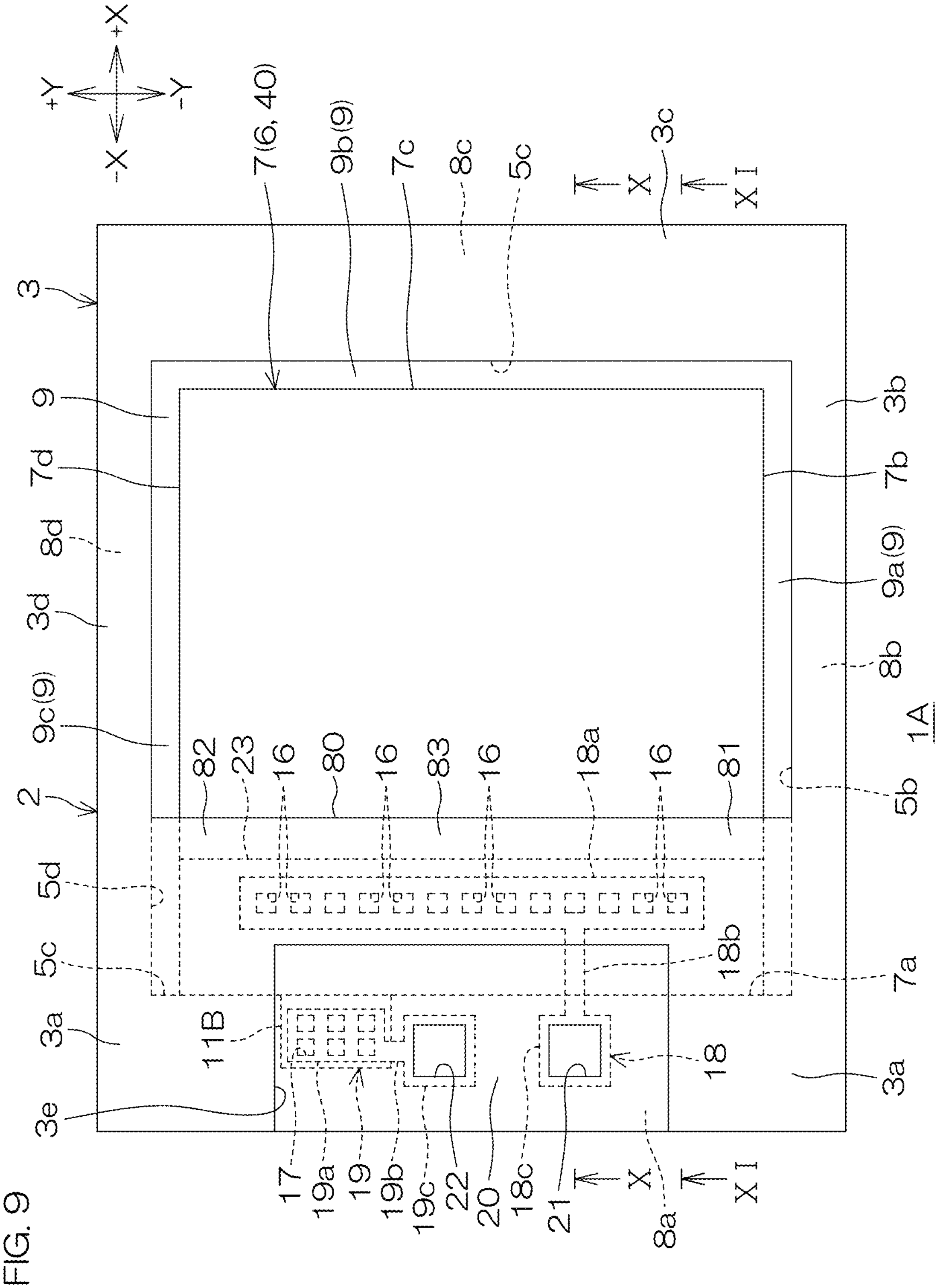
FIG. 9 is an illustrative plan view of a transducer according to a second preferred embodiment of the present disclosure.
Figure 10:
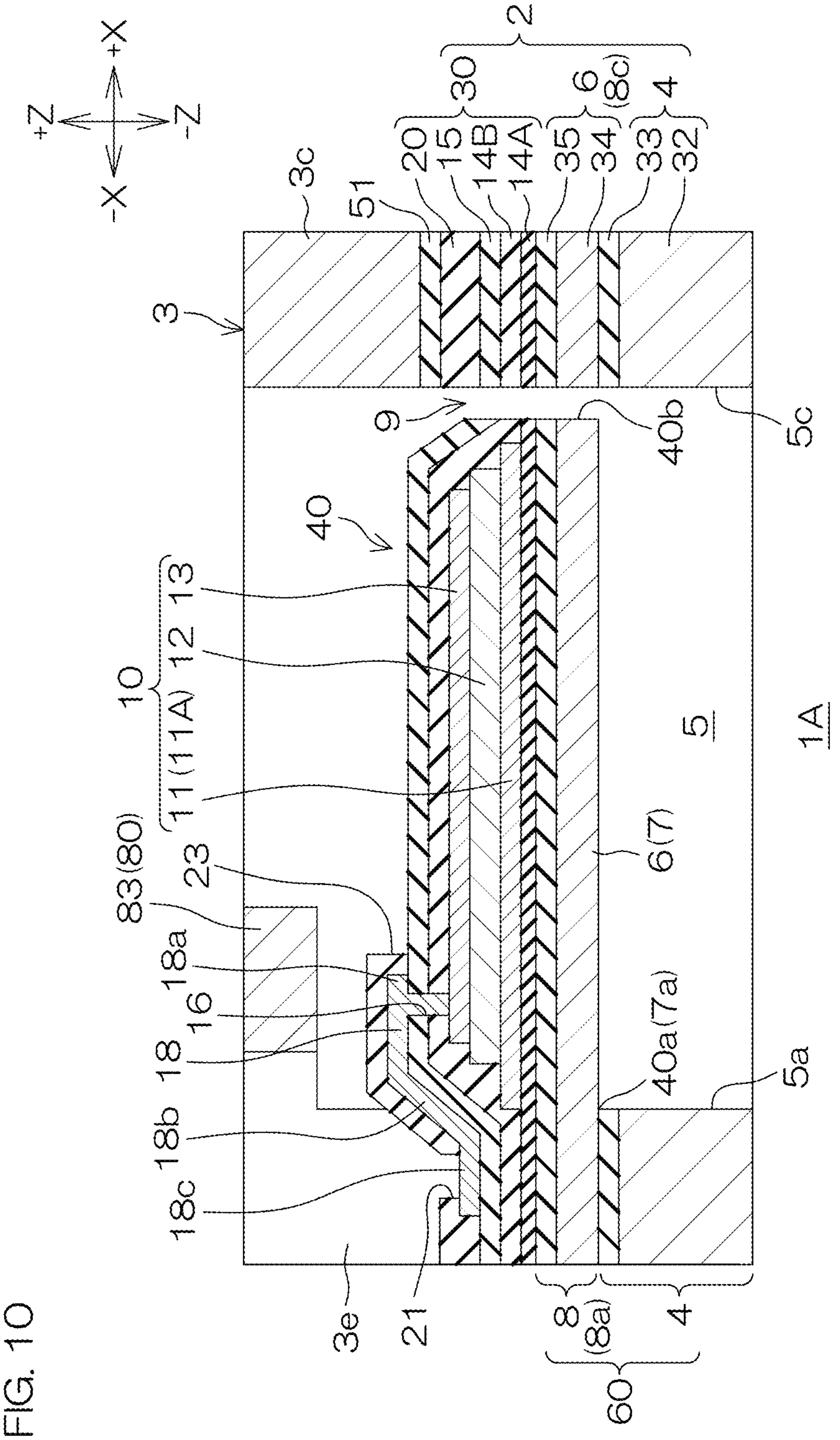
FIG. 10 is an illustrative sectional view taken along line X-X of FIG. 9.
Figure 11:
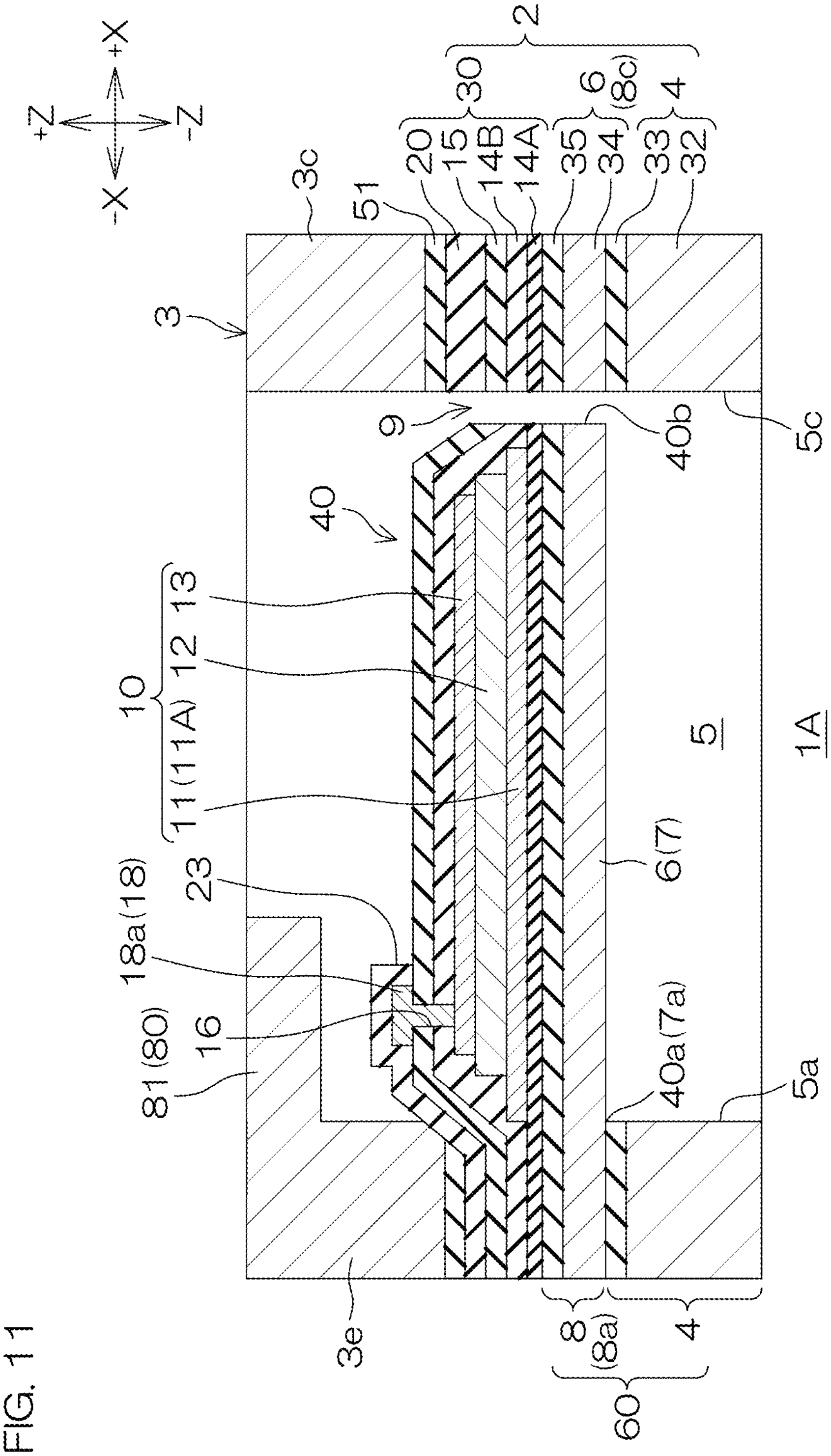
FIG. 11 is an illustrative sectional view taken along line XI-XI of FIG. 9.

FIG. 9 is an illustrative plan view of a transducer according to a second preferred embodiment of the present disclosure. FIG. 10 is an illustrative sectional view taken along line X-X of FIG. 9. FIG. 11 is an illustrative sectional view taken along line XI-XI of FIG. 9.

In FIG. 9, portions corresponding to respective portions of FIG. 1 described above are indicated with the same reference signs attached as in FIG. 1. Also, in FIG. 10, portions corresponding to respective portions of FIG. 2 described above are indicated with the same reference signs attached as in FIG. 2. Also, in FIG. 11, portions corresponding to respective portions of FIG. 3 described above are indicated with the same reference signs attached as in FIG. 3.

For convenience of description, a +X direction, a −X direction, a +Y direction, a −Y direction, a +Z direction, and a −Z direction shown in FIG. 9 to FIG. 11 are used at times in the following description.

Even in the transducer 1A according to the second preferred embodiment, the cutout portion 3*e* in which the first wall portion 3*a* of the protective substrate 3 is not present is formed in a length intermediate portion (a length central portion in the present preferred embodiment) of the first wall portion 3*a* as in the first preferred embodiment.

The transducer 1A according to the second preferred embodiment differs from the transducer 1 according to the first preferred embodiment in the point that an eave-shaped portion 80 that projects in the +X direction from an upper portion of the first wall portion 3*a* is formed on the protective substrate 3.

In the following description, the first wall portion 3*a* at the −Y side with respect to the cutout portion 3*e* shall be referred to as the first wall portion 3*a* at the −Y side and the first wall portion 3*a* at the +Y side with respect to the cutout portion 3*e* shall be referred to as the first wall portion 3*a* at the +Y side.

The eave-shaped portion 80 includes a first portion 81, a second portion 82, and a third portion 83 that joins the first portion 81 and the second portion 82. The first portion 81 is a portion that projects to the +X direction side from an +X side edge of the first wall portion 3*a* at the −Y side. An end surface at the −Y side of the first portion 81 is bonded integrally to an inner side surface of the second wall portion 3*b*.

The second portion 82 is a portion that projects to the +X direction side from an +X side edge of the first wall portion 3*a* at the +Y side. An end surface at the +Y side of the second portion 82 is bonded integrally to an inner side surface of the fourth wall portion 3*d*.

The third portion 83 joins a portion of a +Y side end surface of the first portion 81 excluding a −X side end portion and a portion of a −Y side end surface of the second portion 82 excluding a −X side end portion. In plan view, a −X side edge of the third portion 83 is located further to the +X side than a +X side edge of the cutout portion 3*e*.

Even with the second preferred embodiment, the same effects as the first preferred embodiment can be obtained. Also, with the second preferred embodiment, since the protective substrate 3 has the eave-shaped portion 80, air leak due to the cutout portion 3*e* can be suppressed when the cantilever 40 vibrates.

Also, even with the transducer 1A according to the second preferred embodiment, a resin may be embedded in the cutout portion 3*e* after one ends of wires are connected to the pad portions 18*c* and 19*c*.

Although with the preferred embodiment described above, a case where the transducer 1 is used as a speaker was described, the transducer 1 can also be used as a microphone that detects sound waves.

While preferred embodiments of the present disclosure were described in detail above, these are merely specific examples used to clarify the technical contents of the present disclosure and the present disclosure should not be interpreted as being limited to these specific examples and the scope of the present disclosure is limited only by the appended claims.

The invention claimed is:

1. A transducer comprising:

a supporting body that has a cavity;

a vibrating film that is provided facing the cavity and capable of vibrating in the facing direction; and a piezoelectric element at least a portion of which is formed on a front surface of the vibrating film at an opposite side to the cavity; and wherein the vibrating film has, at a portion of an outer peripheral edge of the vibrating film, a connection portion connected to the supporting body;

a cantilever is formed that includes the vibrating film and a portion of the piezoelectric element disposed on the vibrating film and has a fixed end and a free end;

an internal wiring with one end portion side being electrically connected to the piezoelectric element and having, at another end portion side, a pad portion for external wiring connection on the supporting body outside the vibrating film and a protective substrate having a wall portion formed such as to surround the cantilever and being fixed to the supporting body are further included, the wall portion has, at a location corresponding to a length intermediate portion of the connection portion, a cutout portion in which the wall portion is not present, and the pad portion is disposed at the cutout portion side with respect to the connection portion.

2. The transducer according to claim 1, wherein the piezoelectric element includes a lower electrode at least a portion of which is disposed on the vibrating film, a piezoelectric film that is formed on the lower electrode, and an upper electrode that is formed on the piezoelectric film and the internal wiring includes an upper wiring that is disposed such as to straddle the length intermediate portion of the connection portion, has one end portion side electrically connected to the upper electrode on the vibrating film, and has a first pad portion for external wiring connection on the supporting body outside the vibrating film and a lower wiring that has one end portion side electrically connected to the lower electrode and has a second pad portion for external wiring connection on the supporting body outside the vibrating film.

3. The transducer according to claim 2, wherein the supporting body includes a supporting substrate that has the cavity and a frame body that is formed on the supporting substrate and formed such as to surround the cavity, the connection portion of the vibrating film is connected to the frame body, and a slit in communication with the cavity is formed between the frame body and an outer peripheral edge of the vibrating film excluding the connection portion.

4. The transducer according to claim 3, comprising: a hydrogen barrier film that covers a front surface of the frame body, the front surface of the vibrating film, and a front surface of the piezoelectric element; and an insulating interlayer film that is selectively formed on the hydrogen barrier film; and wherein the upper wiring is formed on the insulating interlayer film, the one end portion side of the upper wiring penetrates through a laminated film of the hydrogen barrier film and the insulating interlayer film and is electrically connected to the upper electrode, the lower wiring is formed on the insulating interlayer film, and the one end portion side of the lower wiring penetrates through the laminated film of the hydrogen barrier film and the insulating interlayer film and is electrically connected to the lower electrode.

5. The transducer according to claim 4, comprising: a passivation film that is formed on the insulating interlayer film and covers the upper wiring and the lower wiring.

6. The transducer according to claim 2, wherein a resin that is embedded in the cutout portion.

7. The transducer according to claim 2, wherein the protective substrate has an eave-shaped portion that is disposed along the cutout portion at a portion further to the vibrating film side than the cutout portion.

8. A method for manufacturing a transducer comprising:

a step of forming a piezoelectric element on a vibrating film formation layer that is formed on a supporting substrate;

a step of forming a slit penetrating through the vibrating film formation layer in a thickness direction to form, in the vibrating film formation layer, a vibrating film and a frame body that surrounds the vibrating film and with which a portion is connected to a portion of an outer peripheral edge of the vibrating film;

a step of forming an internal wiring with one end portion side being electrically connected to the piezoelectric element and having, at another end portion side, a pad portion for external wiring connection on the frame body; and a step of etching the supporting substrate from a cavity formation planned region of a front surface of the supporting substrate at an opposite side to the vibrating film formation layer to form, in a region facing the vibrating film, a cavity that is in communication with the slit; and wherein a cantilever that includes the vibrating film and a portion of the piezoelectric element disposed on the vibrating film and has a fixed end and a free end is formed by the step of forming the cavity, a step of fixing, to the supporting body, a protective substrate having a wall portion formed such as to surround the cantilever is further included, the wall portion has, at a location corresponding to a length intermediate portion of the connection portion, a cutout portion in which the wall portion is not present, and the pad portion is disposed at the cutout portion side with respect to the connection portion.

* * * * *